US012779830B2

(12) United States Patent
Fukugami et al.

(10) Patent No.: US 12,779,830 B2
(45) Date of Patent: Nov. 3, 2026

(54) BARRIER FILM, LAMINATE, AND PACKAGING BAG

(71) Applicant: TOPPAN Holdings Inc., Tokyo (JP)

(72) Inventors: Miki Fukugami, Tokyo (JP); Ikuko Yamakawa, Tokyo (JP); Kaoru Furuta, Tokyo (JP)

(73) Assignee: TOPPAN HOLDINGS INC., Tokyo (JP)

(*) Notice: Subject to any disclaimer, the term of this patent is extended or adjusted under 35 U.S.C. 154(b) by 239 days.

(21) Appl. No.: 18/711,806

(22) PCT Filed: Nov. 28, 2022

(86) PCT No.: PCT/JP2022/043811
§ 371 (c)(1),
(2) Date: May 20, 2024

(87) PCT Pub. No.: WO2023/095915
PCT Pub. Date: Jun. 1, 2023

(65) Prior Publication Data
US 2026/0166868 A1 Jun. 18, 2026

(30) Foreign Application Priority Data
Nov. 29, 2021 (JP) ................................ 2021-192905
Mar. 4, 2022 (JP) ................................ 2022-033545

(51) Int. Cl.
*B32B 27/32* (2006.01)
*B32B 7/027* (2019.01)
(Continued)

(52) U.S. Cl.
CPC .............. *B32B 27/32* (2013.01); *B32B 7/027* (2019.01); *B32B 37/24* (2013.01); *B65D 65/40* (2013.01);
(Continued)

(58) Field of Classification Search
CPC .......... B32B 27/32; C08L 23/10; C08L 23/12; C08L 23/14; C08L 23/142; C08L 23/16
See application file for complete search history.

(56) References Cited

U.S. PATENT DOCUMENTS 8,846,599 B2 9/2014 Haberecht et al.
2010/0280485 A1* 11/2010 Choi ....................... C08L 23/10 428/517

(Continued)

FOREIGN PATENT DOCUMENTS

JP 63-290743 11/1988
JP 63-291929 11/1988

(Continued)

OTHER PUBLICATIONS

JP H09-290477A Machine translation (Year: 1997).*

(Continued)

*Primary Examiner* — Zachary M Davis
(74) *Attorney, Agent, or Firm* — STAAS & HALSEY LLP

(57) ABSTRACT

A barrier film according to the first aspect of the present disclosure contains, in the following order: a base material layer containing polypropylene; a vapor deposition layer containing an inorganic oxide; and a gas barrier layer, in which the base material layer has a multilayer structure in which at least three layers, which are a first skin layer, a core layer, and a second skin layer, are provided in this order, and in which when a softening temperature of each of the layers of the base material layer is measured by local thermal analysis (LTA), at least one softening temperature of the first skin layer is 120° C. or higher, at least one softening temperature of the core layer is 190° C. or higher, and at least one softening temperature of the second skin layer is 160° C. or lower.

20 Claims, 6 Drawing Sheets

(51) Int. Cl.
*B32B 37/24* (2006.01)
*B65D 65/40* (2006.01)
*B65D 65/42* (2006.01)

(52) U.S. Cl.
CPC ........ *B65D 65/42* (2013.01); *B32B 2037/246* (2013.01); *B32B 2250/03* (2013.01); *B32B 2255/10* (2013.01); *B32B 2255/20* (2013.01); *B32B 2255/28* (2013.01); *B32B 2307/7242* (2013.01); *B32B 2307/7376* (2023.05); *B32B 2553/00* (2013.01)

(56) References Cited

U.S. PATENT DOCUMENTS

| | | | |
|---|---|---|---|
| 2022/0288902 | A1 | 9/2022 | Hayashi et al. |
| 2023/0053232 | A1 | 2/2023 | Fukugami et al. |
| 2024/0149559 | A1 | 5/2024 | Tanaka et al. |
| 2024/0278546 | A1 | 8/2024 | Fukugami et al. |
| 2025/0100262 | A1 | 3/2025 | Fukugami |
| 2026/0166868 | A1 | 6/2026 | Fukugami et al. |

FOREIGN PATENT DOCUMENTS

| | | | | |
|---|---|---|---|---|
| JP | 9-290477 | | | 11/1997 |
| JP | H09290447 | A | * | 11/1997 |
| JP | 2004-527398 | | | 9/2004 |
| JP | 2006-159801 | | | 6/2006 |
| JP | 2008-230153 | | | 10/2008 |
| JP | 2009-500207 | | | 1/2009 |
| JP | 2014-525859 | | | 10/2014 |
| JP | 2020-040257 | | | 3/2020 |
| JP | 2021-020391 | | | 2/2021 |
| WO | WO 02/081205 | A1 | | 10/2002 |
| WO | WO 2007/006657 | A1 | | 1/2007 |
| WO | WO 2013/024259 | A1 | | 2/2013 |
| WO | WO 2021/220935 | A1 | | 11/2021 |
| WO | WO 2021/230319 | A1 | | 11/2021 |
| WO | WO 2021/112243 | A1 | | 6/2022 |
| WO | WO 2022/196211 | A1 | | 9/2022 |
| WO | WO 2023/074683 | A1 | | 5/2023 |
| WO | WO 2023/095915 | A1 | | 6/2023 |
| WO | WO 2023/243625 | A1 | | 12/2023 |

OTHER PUBLICATIONS

Indian Office Action issued in counterpart Indian Application No. 202447038471 dated Apr. 30, 2026.

European Office Action issued in counterpart European Application No. 22 898 697.2 dated Oct. 10, 2025.

English Translation of IPRP (PCT/IB/338 and PCT/IB/373) (Jun. 13, 2024 and May 2, 2024) and the Written Opinion of ISA (PCT/ISA/237) issued in counterpart International Application No. PCT/JP2022/043811 on Feb. 14, 2023 (7 pages).

International Search Report issued in International Application No. PCT/JP2022/043811 dated Feb. 14, 2023.

Japanese Office Action issued in counterpart Japanese Application No. 2023-540912 dated May 17, 2024.

* cited by examiner

BARRIER FILM, LAMINATE, AND PACKAGING BAG

CROSS-REFERENCE TO RELATED APPLICATIONS

This application is a 35 U.S.C. § 371 national phase application of PCT/JP2022/043811, filed on Nov. 28, 2022, which claims priority to Japanese Patent Application No. 2021-192905, filed on Nov. 29, 2021 and Japanese Patent Application No. 2022-033545, filed Mar. 4, 2022, the contents of all of which are incorporated herein by reference.

TECHNICAL FIELD

The present disclosure relates to a barrier film, a laminate, and a packaging bag.

BACKGROUND ART

Barrier films are widely used mainly as packaging materials for foods, medical drugs, and the like which are subjected to heat sterilization treatments such as a boiling treatment and a retort treatment. In packaging these contents, emphasis has been placed particularly on reducing oxygen permeability. As such a barrier film used for packaging materials subjected to heat sterilization, a highly heat-resistant polyethylene terephthalate film is generally used as a base material.

However, in recent years, with increased awareness about environmental issues, there has been increasing interest in packaging materials formed using a single material, so-called mono-material packaging materials, in order to make packaging materials suitable for recycling. Because olefinic films such as polypropylene are generally used as a sealant layer in packaging materials, in order to produce mono-material packaging materials using such a sealant layer, it is also required to use polypropylene as a base material in barrier films. For example, Patent Literature 1 and Patent Literature 2 below propose mono-material packaging materials formed using polypropylene.

Polypropylene films are widely used for packaging materials and the like because of their excellent transparency, mechanical strength, and heat resistance. However, unlike polyethylene terephthalate and the like, polypropylene does not have sufficient secondary workability such as metal vapor deposition properties, adhesiveness to other resins, and printability. Various methods have been proposed to solve these problems. For example, Patent Literature 3 proposes a polypropylene film formed from a blend of polypropylene and an ethylene-α-olefin copolymer, and Patent Literature 4 proposes a polypropylene film having a layer formed from a blend of polypropylene and an ethylene-α-olefin copolymer, and a layer formed from a polypropylene resin.

CITATION LIST

Patent Literature

[Patent Literature 1] Japanese Unexamined Patent Publication No. 2020-40257
[Patent Literature 2] Japanese Unexamined Patent Publication No. 2021-20391
[Patent Literature 3] Japanese Unexamined Patent Publication No. S63-291929

[Patent Literature 4] Japanese Unexamined Patent Publication No. S63-290743

SUMMARY OF INVENTION

Technical Problem

However, in the configuration of conventional barrier films and laminates, not only can oxygen permeability not be suppressed to a low level after a heat sterilization treatment, but also the adhesion strength between films (interlaminar adhesion strength) after the heat sterilization treatment is low. Therefore, with use in a pouch filled with contents, there were problems of a low tear strength of a pouch, and a pouch being susceptible to destruction by impact such as dropping.

The present disclosure has been made in view of the above-mentioned circumstances, and an object thereof is to provide a barrier film capable of suppressing oxygen permeability to a low level even after a heat sterilization treatment, and capable of maintaining a sufficient adhesion strength between films (interlaminar adhesion strength) even after the heat sterilization treatment, and a laminate and a packaging bag which are formed using the barrier film.

Solution to Problem (First Aspect)

The present disclosure provides a barrier film containing, in the following order: a base material layer containing polypropylene; a vapor deposition layer containing an inorganic oxide; and a gas barrier layer, in which the above-mentioned base material layer has a multilayer structure in which at least three layers, which are a first skin layer, a core layer, and a second skin layer, are provided in this order, and in which when a softening temperature of each of the layers of the above-mentioned base material layer is measured by local thermal analysis (LTA), at least one softening temperature of the above-mentioned first skin layer is 120° C. or higher, at least one softening temperature of the above-mentioned core layer is 190° C. or higher, and at least one softening temperature of the above-mentioned second skin layer is 160° C. or lower.

According to the above-mentioned barrier film, since the base material layer has the first skin layer, the core layer, and the second skin layer, each of which has a softening temperature within the above-mentioned specific range, the adhesion strength between the base material layer and each of the layers configuring the barrier film is increased, which makes it possible to suppress oxygen permeability to a low level even after a heat sterilization treatment, and to maintain a sufficient adhesion strength between the films (interlaminar adhesion strength) even after the heat sterilization treatment. Furthermore, when a laminate is formed by laminating a sealant layer, or a sealant layer and a second base material layer to the above-mentioned barrier film, the adhesion strength between the barrier film and the sealant layer and/or the second base material layer can be increased. Therefore, by using the above-mentioned barrier film, it is possible to obtain a laminate capable of suppressing oxygen permeability to a low level even after the heat sterilization treatment, and capable of maintaining a sufficient adhesion strength between the films (interlaminar adhesion strength) even after the heat sterilization treatment, and a packaging bag formed using the laminate.

In the above-mentioned barrier film, when the softening temperature of the above-mentioned first skin layer is measured by LTA, at least one softening temperature of the first skin layer may be 120° C. or higher and 170° C. or lower. In this case, the barrier film is capable of suppressing oxygen permeability to a lower level even after the heat sterilization treatment, and capable of maintaining a more sufficient adhesion strength between the films even after the heat sterilization treatment.

In the above-mentioned barrier film, when the softening temperature of the above-mentioned second skin layer is measured by LTA, at least one softening temperature of the second skin layer may be 120° C. or higher and 160° C. or lower. In this case, the barrier film is capable of suppressing oxygen permeability to a lower level even after the heat sterilization treatment, and capable of maintaining a more sufficient adhesion strength between the films even after the heat sterilization treatment.

In the above-mentioned barrier film, the above-mentioned first skin layer and the above-mentioned second skin layer may contain a copolymer of propylene and α-olefin. In this case, the barrier film is capable of suppressing oxygen permeability to a lower level even after the heat sterilization treatment, and capable of maintaining a more sufficient adhesion strength between the films even after the heat sterilization treatment.

In the above-mentioned barrier film, when the softening temperature of each of the layers of the base material layer is measured by LTA, at least one softening temperature of the above-mentioned core layer may be higher than any of the softening temperatures of the above-mentioned first skin layer and the above-mentioned second skin layer. In this case, the barrier film is capable of suppressing oxygen permeability to a lower level even after the heat sterilization treatment.

In the above-mentioned barrier film, when the softening temperature of each of the layers of the above-mentioned base material layer is measured by LTA, at least one softening temperature of the above-mentioned first skin layer may be higher than any of the softening temperatures of the above-mentioned second skin layer. In this case, the barrier film is capable of suppressing oxygen permeability to a lower level even after the heat sterilization treatment. Furthermore, when a laminate is formed by laminating a sealant layer, or a sealant layer and a second base material layer to the above-mentioned barrier film, the adhesion strength between the barrier film and the sealant layer and/or the second base material layer can be further increased.

In the above-mentioned barrier film, a thickness of each of the above-mentioned first skin layer and the above-mentioned second skin layer may be 2.0 μm or less. In this case, the barrier film is capable of suppressing oxygen permeability to a lower level even after the heat sterilization treatment, and capable of maintaining a more sufficient adhesion strength between the films even after the heat sterilization treatment.

In the above-mentioned barrier film, the above-mentioned vapor deposition layer may contain at least one selected from the group consisting of aluminum oxide and silicon oxide. In this case, the barrier film is capable of suppressing oxygen permeability to a lower level even after the heat sterilization treatment, and capable of maintaining a more sufficient adhesion strength between the films even after the heat sterilization treatment.

In the above-mentioned barrier film, the above-mentioned gas barrier layer may contain a water-soluble polymer having a hydroxyl group and at least one selected from the group consisting of a metal alkoxide, a silane coupling agent, and a hydrolysate thereof. In this case, the barrier film is capable of suppressing oxygen permeability to a lower level even after the heat sterilization treatment, and capable of maintaining a more sufficient adhesion strength between the films even after the heat sterilization treatment.

In the above-mentioned barrier film, the above-mentioned vapor deposition layer may be formed on a surface of the above-mentioned first skin layer which is on an opposite side to the above-mentioned core layer. Furthermore, in this case, the above-mentioned barrier film may further have an anchor coat layer between the above-mentioned first skin layer and the above-mentioned vapor deposition layer. The barrier film having the above-mentioned configuration can further improve the adhesion strength between the first skin layer and the vapor deposition layer. Therefore, the above-mentioned barrier film is capable of suppressing oxygen permeability to a lower level even after the heat sterilization treatment, and capable of maintaining a more sufficient adhesion strength between the films even after the heat sterilization treatment.

The present disclosure further provides a laminate containing: the above-mentioned barrier film of the present disclosure; and a sealant layer, in which the above-mentioned sealant layer contains polyolefin. The above-mentioned laminate may further have a second base material layer on a surface on an opposite side to the above-mentioned sealant layer of the above-mentioned barrier film, in which the above-mentioned second base material layer may contain polyolefin. Since the above-mentioned laminate is formed using the above-mentioned barrier film of the present disclosure, oxygen permeability can be suppressed to a low level even after the heat sterilization treatment, and a sufficient adhesion strength can be maintained between the films even after the heat sterilization treatment. Furthermore, the above-mentioned laminate is useful as a mono-material packaging material.

The present disclosure still further provides a packaging bag formed by making the above-mentioned laminate of the present disclosure into a pouch shape. Since the above-mentioned packaging bag is formed using the above-mentioned laminate of the present disclosure, oxygen permeability can be suppressed to a low level even after the heat sterilization treatment, and a sufficient adhesion strength can be maintained between the films even after the heat sterilization treatment. Furthermore, the above-mentioned packaging bag is useful as a mono-material packaging material.

(Second Aspect)

The present disclosure provides a barrier film containing, in the following order: a base material layer containing polypropylene; a vapor deposition layer containing an inorganic oxide; and a gas barrier layer, in which the above-mentioned base material layer has two layers, which are a skin layer and a core layer, in order from the vapor deposition layer, and in which, when a softening temperature of each of the layers of the above-mentioned base material layer is measured by local thermal analysis (LTA), at least one softening temperature of the above-mentioned skin layer is 115° C. or higher and 170° C. or lower, and at least one softening temperature of the above-mentioned core layer is 190° C. or higher.

According to the above-mentioned barrier film, since the above-mentioned base material layer has the above-mentioned skin layer and the above-mentioned core layer, each of which has a softening temperature within the above-mentioned specific range, the adhesion strength between the films is increased, which makes it possible to suppress oxygen permeability to a low level even after a heat sterilization treatment, and to maintain a sufficient adhesion strength between the films even after the heat sterilization treatment. Therefore, by using the above-mentioned barrier film, it is possible to obtain a laminate capable of suppressing oxygen permeability to a low level even after the heat sterilization treatment, and capable of maintaining a sufficient adhesion strength between the films even after the heat sterilization treatment, and a packaging bag formed using the laminate.

The above-mentioned barrier film, the above-mentioned skin layer may contain a copolymer of propylene and α-olefin. In this case, the barrier film is capable of suppressing oxygen permeability to a lower level even after the heat sterilization treatment, and capable of maintaining a more sufficient adhesion strength between the films even after the heat sterilization treatment.

In the above-mentioned barrier film, the above-mentioned skin layer may contain an ethylene-1-butene-propylene random copolymer. In this case, the barrier film is capable of suppressing oxygen permeability to a lower level even after the heat sterilization treatment.

In the above-mentioned barrier, a thickness of the above-mentioned skin layer may be 0.2 μm or more and 2.0 μm or less. In this case, the barrier film is capable of suppressing oxygen permeability to a lower level even after the heat sterilization treatment, and capable of maintaining a more sufficient adhesion strength between the films even after the heat sterilization treatment.

In the above-mentioned barrier film, a ratio of a thickness of the above-mentioned skin layer to a thickness of the above-mentioned core layer may be 1/100 to 1/5. In this case, the barrier film is capable of suppressing oxygen permeability to a lower level even after the heat sterilization treatment, and capable of maintaining a more sufficient adhesion strength between the films even after the heat sterilization treatment.

In the above-mentioned barrier film, the above-mentioned vapor deposition layer may contain at least one selected from the group consisting of aluminum oxide and silicon oxide. In this case, the barrier film is capable of suppressing oxygen permeability to a lower level even after the heat sterilization treatment, and capable of maintaining a more sufficient adhesion strength between the films even after the heat sterilization treatment.

In the above-mentioned barrier film, the above-mentioned gas barrier layer may be formed from a coating liquid containing at least one silicon compound selected from $Si(OR^1)_4$ and $R^2Si(OR^3)_3$ (where $OR^1$ and $OR^3$ are each independently a hydrolyzable group, and $R^2$ is an organic functional group) or a hydrolysate thereof, and containing a water-soluble polymer having a hydroxyl group. In this case, the barrier film is capable of suppressing oxygen permeability to a lower level even after the heat sterilization treatment, and capable of maintaining a more sufficient adhesion strength between the films even after the heat sterilization treatment.

The above-mentioned barrier film may further have an anchor coat layer between the above-mentioned skin layer and the above-mentioned vapor deposition layer. The barrier film having the above-mentioned configuration can further improve the adhesion strength between the skin layer and the vapor deposition layer. Therefore, the above-mentioned barrier film is capable of suppressing oxygen permeability to a lower level even after the heat sterilization treatment, and capable of maintaining a more sufficient adhesion strength between the films even after the heat sterilization treatment.

The present disclosure further provides a laminate containing: the above-mentioned barrier film of the present disclosure; and a sealant layer, in which the above-mentioned sealant layer contains polyolefin. The above-mentioned laminate may further have a second base material layer on a surface on an opposite side to the above-mentioned sealant layer of the above-mentioned barrier film, in which the above-mentioned second base material layer may contain polyolefin. Since the above-mentioned laminate is formed using the above-mentioned barrier film of the present disclosure, oxygen permeability can be suppressed to a low level even after the heat sterilization treatment, and a sufficient adhesion strength can be maintained between the films even after the heat sterilization treatment. Furthermore, the above-mentioned laminate is useful as a mono-material packaging material.

The present disclosure still further provides a packaging bag formed by making the above-mentioned laminate of the present disclosure into a pouch shape. Since the above-mentioned packaging bag is formed using the above-mentioned laminate of the present disclosure, oxygen permeability can be suppressed to a low level even after the heat sterilization treatment, and a sufficient adhesion strength can be maintained between the films even after the heat sterilization treatment. Furthermore, the above-mentioned packaging bag is useful as a mono-material packaging material.

Advantageous Effects of Invention

According to the present disclosure, it is possible to provide a barrier film capable of suppressing oxygen permeability to a low level even after a heat sterilization treatment, and capable of maintaining a sufficient adhesion strength between films (interlaminar adhesion strength) even after the heat sterilization treatment, and a laminate and a packaging bag which are formed using the barrier film.

DESCRIPTION OF EMBODIMENTS

Figure 1:
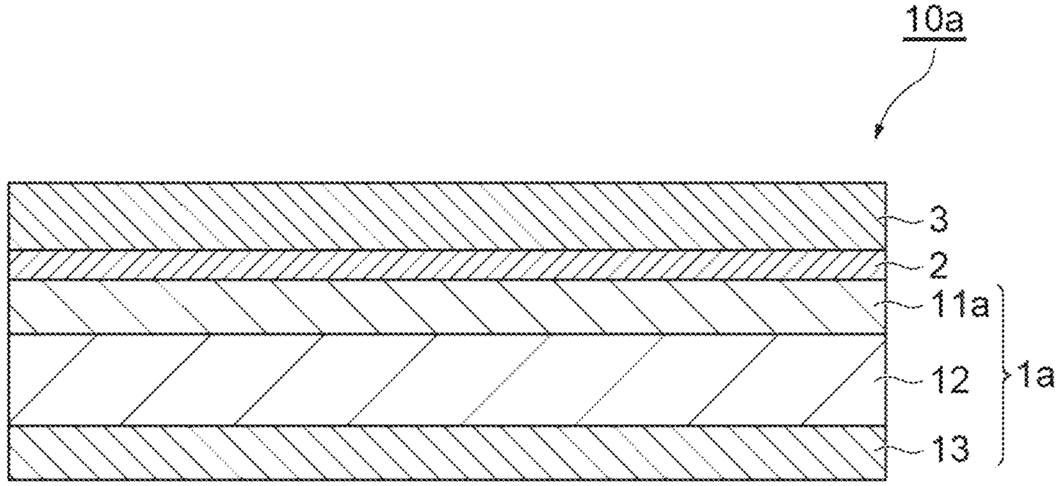
FIG. 1 is a schematic cross-sectional view showing a barrier film according to one embodiment of the present disclosure.

Hereinbelow, embodiments of the present disclosure will be described in detail with reference to the drawings in some cases. However, the present disclosure is not limited to the following embodiments.

The present disclosure provides a barrier film, a laminate, and a packaging bag below.

[1] A barrier film containing, in the following order: a base material layer containing polypropylene; a vapor deposition layer containing an inorganic oxide; and a gas barrier layer, in which the above-mentioned base material layer has a multilayer structure in which at least three layers, which are a first skin layer, a core layer, and a second skin layer, are provided in this order, and in which when a softening temperature of each of the layers of the above-mentioned base material layer is measured by local thermal analysis (LTA), at least one softening temperature of the above-mentioned first skin layer is 120° C. or higher, at least one softening temperature of the above-mentioned core layer is 190° C. or higher, and at least one softening temperature of the above-mentioned second skin layer is 160° C. or lower.

[2] The barrier film according to [1], in which, when the softening temperature of the first skin layer is measured by LTA, at least one softening temperature of the first skin layer is 120° C. or higher and 170° C. or lower.

[3] The barrier film according to [1] or [2], in which, when the softening temperature of the second skin layer is measured by LTA, at least one softening temperature of the second skin layer is 120° C. or higher and 160° C. or lower.

[4] The barrier film according to any one of [1] to [3], in which, wherein the first skin layer and the second skin layer contain a copolymer of propylene and α-olefin.

[5] The barrier film according to any one of [1] to [3], in which, when the softening temperature of each of the layers of the base material layer is measured by LTA, at least one softening temperature of the core layer is higher than any of the softening temperatures of the first skin layer and the second skin layer.

[6] The barrier film according to any one of [1] to [5], in which, when the softening temperature of each of the layers of the base material layer is measured by LTA, at least one softening temperature of the first skin layer is higher than any of the softening temperatures of the second skin layer.

[7] The barrier film according to any one of [1] to [6], in which a thickness of each of the first skin layer and the second skin layer is 2.0 μm or less.

[8] The barrier film according to any one of [1] to [7], in which the vapor deposition layer contains at least one selected from the group consisting of aluminum oxide and silicon oxide.

[9] The barrier film according to any one of [1] to [8], in which the gas barrier layer contains a water-soluble polymer having a hydroxyl group and at least one selected from the group consisting of a metal alkoxide, a silane coupling agent, and a hydrolysate thereof.

[10] The barrier film according to any one of [1] to [9], in which the vapor deposition layer is formed on a surface of the first skin layer which is on an opposite side to the core layer.

[11] The barrier film according to [10], further containing an anchor coat layer between the first skin layer and the vapor deposition layer.

[12] A barrier film containing, in the following order: a base material layer containing polypropylene; a vapor deposition layer containing an inorganic oxide; and a gas barrier layer, in which the above-mentioned base material layer has two layers, which are a skin layer and a core layer, in order from the vapor deposition layer, and in which, when a softening temperature of each of the layers of the above-mentioned base material layer is measured by local thermal analysis (LTA), at least one softening temperature of the above-mentioned skin layer is 115° C. or higher and 170° C. or lower, and at least one softening temperature of the above-mentioned core layer is 190° C. or higher.

[13] The barrier film according to [12], in which the skin layer contains a copolymer of propylene and α-olefin.

[14] The barrier film according to [12] or [13], in which the skin layer contains an ethylene-1-butene-propylene random copolymer.

[15] The barrier film according to any one of [12] to [14], in which a thickness of the skin layer is 0.2 μm or more and 2.0 μm or less.

[16] The barrier film according to any one of [12] to [15], in which a ratio of a thickness of the skin layer to a thickness of the core layer is 1/100 to 1/5.

[17] The barrier film according to any one of [12] to [16], in which the vapor deposition layer contains at least one selected from the group consisting of aluminum oxide and silicon oxide.

[18] The barrier film according to any one of [12] to [17], in which the gas barrier layer is formed from a coating liquid containing at least one silicon compound selected from $Si(OR^1)_4$ and $R^2Si(OR^3)_3$ (where $OR^1$ and $OR^3$ are each independently a hydrolyzable group, and $R^2$ is an organic functional group) or a hydrolysate thereof, and containing a water-soluble polymer having a hydroxyl group.

[19] The barrier film according to any one of [12] to [18], further containing an anchor coat layer between the skin layer and the vapor deposition layer.

[20] A laminate containing: the barrier film according to any one of [1] to [19]; and a sealant layer, in which the sealant layer contains polyolefin.

[21] The laminate according to [20], further containing: a second base material layer on a surface on an opposite side to the sealant layer of the barrier film, in which the second base material layer contains polyolefin.

[22] A packaging bag formed by making the laminate according to [20] or [21] into a pouch shape.

<Barrier Film According to First Aspect>

A barrier film according to the first aspect is a barrier film containing, in the following order: a base material layer containing polypropylene; a vapor deposition layer containing an inorganic oxide; and a gas barrier layer, in which the base material layer has a multilayer structure in which at least three layers, which are a first skin layer, a core layer, and a second skin layer, are provided in this order, and in which when a softening temperature of each of the layers of the base material layer is measured by local thermal analysis (LTA), at least one softening temperature of the first skin layer is 120° C. or higher, at least one softening temperature of the core layer is 190° C. or higher, and at least one softening temperature of the second skin layer is 160° C. or lower.

FIG. 1 is a schematic cross-sectional view showing a barrier film according to the first aspect of the present embodiment. As shown in FIG. 1, a barrier film **10*a* according to the present embodiment has a base material layer 1*a*, a vapor deposition layer 2, and a gas barrier layer 3** in this order.

[Base Material Layer]

The base material layer **1*a* is a film (base film) serving as a support, and contains polypropylene. The base material layer 1*a* is a film having a multilayer structure in which at least three layers: a first skin layer 11*a*, a core layer 12, and a second skin layer 13 are provided. The base material layer 1*a* may be a film made of polypropylene, or may be a film obtained by forming polypropylene into a sheet, and stretching the sheet by ordinary means to uniaxially or biaxially orient the sheet. Stretching may be performed on a film having a multilayer structure. Known additives may be added to the base material layer 1*a*** depending on the purpose. Examples of the known additives include inorganic additives such as antioxidants; stabilizers; lubricants such as calcium stearate, fatty acid amide, and erucic acid amide; organic additives such as antistatic agents; and particulate lubricants such as silica, zeolite, thyroid, hydrotalcite, and silicon particles.

The thickness (total thickness) of the base material layer 1*a* is not particularly limited, but may be 3 μm or more and 200 μm or less, may be 6 μm or more and 50 μm or less, or may be 10 μm or more and 30 μm or less, for example.

The core layer 12 is a layer in which at least one softening temperature is 190° C. or higher, when a softening temperature is measured from a cross section of the film by local thermal analysis (LTA) to be described later. The above-mentioned at least one softening temperature may be 195° C. or higher, or may be 198° C. or higher and 220° C. or lower. As the softening temperature, a temperature measured at the center portion of the core layer 12 in a thickness direction is used. When the above-mentioned at least one softening temperature is 190° C. or higher, the heat resistance of the base material layer 1*a* can be increased, which leads to heat resistance at the time of a heat sterilization treatment, and this can prevent a problem of making it not possible to use as a packaging material due to shrinkage of the base material layer 1*a* at the time of the heat sterilization treatment. The core layer 12 may be a layer having one softening temperature or may be a layer having multiple softening temperatures. When the core layer 12 has multiple softening temperatures, it is sufficient for at least one softening temperature to satisfy the above-mentioned conditions.

Polypropylene used for the core layer 12 may be crystalline polypropylene from the viewpoint of increasing the heat resistance of the base material layer 1*a*, and may be homopolypropylene, which is a homopolymer of propylene, from the viewpoint of further improving the heat resistance for the heat sterilization treatment. However, a random copolymer of propylene and α-olefin, a mixture of this copolymer and homopolypropylene, or the like may also be used as long as the effects of the present disclosure are not significantly impaired.

The first skin layer 11*a* is provided on one surface of the core layer 12, and the second skin layer 13 is provided on the other surface thereof. Both surfaces of the base material layer 1*a* may be formed from the first skin layer 11*a* and the second skin layer 13. Another layer may be provided between the core layer 12 and the first skin layer 11*a*, but the core layer 12 and the first skin layer 11*a* may be in contact with each other without the other layer therebetween. Another layer may be provided between the core layer 12 and the second skin layer 13, but the core layer 12 and the second skin layer 13 may be in contact with each other without the other layer therebetween.

The first skin layer 11*a* is a layer in which at least one softening temperature is 120° C. or higher, when a softening temperature is measured from a cross section of the film by local thermal analysis (LTA) to be described later. The above-mentioned at least one softening temperature may be 120° C. or higher and 170° C. or lower, or may be 125° C. or higher and 168° C. or lower. As the softening temperature, a temperature measured at the center portion of the first skin layer 11*a* in a thickness direction is used. When the above-mentioned at least one softening temperature is 120° C. or higher, the heat resistance of the first skin layer 11*a* is not too low, and there is little risk of causing a degradation in adhesion and a deterioration in barrier properties due to softening of the first skin layer 11*a* at the time of the heat sterilization treatment. Furthermore, when the above-mentioned at least one softening temperature is 170° C. or lower, a degradation in flexibility of the first skin layer 11*a* can be prevented, which makes it possible to increase the adhesion strength between the first skin layer 11*a* and the core layer 12. The first skin layer 11*a* may be a layer having one softening temperature or may be a layer having multiple softening temperatures. When the first skin layer 11*a* has multiple softening temperatures, it is sufficient for at least one softening temperature to satisfy the above-mentioned conditions.

The second skin layer 13 is a layer in which at least one softening temperature is 160° C. or lower, when a softening temperature is measured from a cross section of the film by local thermal analysis (LTA) to be described later. The above-mentioned at least one softening temperature may be 120° C. or higher and 160° C. or lower, or may be 122° C. or higher and 155° C. or lower. As the softening temperature, a temperature measured at the center portion of the second skin layer 13 in a thickness direction is used. When the above-mentioned at least one softening temperature is 160° C. or lower, a degradation in flexibility of the second skin layer 13 can be prevented, which makes it possible to increase the adhesion strength between the second skin layer 13 and the core layer 12. Furthermore, when the above-mentioned at least one softening temperature is 120° C. or higher, the heat resistance of the second skin layer 13 is not too low, and there is little risk of causing a degradation in adhesion and a deterioration in barrier properties due to softening of the second skin layer 13 at the time of the heat sterilization treatment. The second skin layer 13 may be a layer having one softening temperature or may be a layer having multiple softening temperatures. When the second skin layer 13 has multiple softening temperatures, it is sufficient for at least one softening temperature to satisfy the above-mentioned conditions.

Polypropylene used for the first skin layer 11*a* and the second skin layer 13 may include a copolymer of propylene and other monomers from the viewpoint of improving adhesion to the core layer 12. As other monomers, for example, α-olefins such as ethylene, 1-butene, and 1-hexene may be used. The copolymer may be a random copolymer.

Mono-material packaging materials formed using a polypropylene film generally have a three-layer structure of outer film (second base material layer)/barrier film/sealant layer in order to increase stand-up strength and independence as packaging bags. The base material layer 1*a* in the barrier film 10*a* of the present embodiment has the second skin layer 13 on the surface on the opposite side to a barrier-forming surface (the surface on the side on which the vapor deposition layer and the gas barrier layer are formed) for the purpose of increasing the lamination strength with an adjacent layer (second base material layer or sealant layer). The second skin layer 13 has a softening temperature of 160° C. or lower. When the second skin layer 13 has a softening temperature of 160° C. or lower, the second skin layer 13 has high flexibility, which makes it possible to obtain favorable adhesion strength to the core layer 12.

Regarding the softening temperature of each of the layers, the softening temperature of the core layer 12 is preferably set highest in order to reduce the shrinkage of the base material layer 1*a* in the heat sterilization treatment and to maintain the adhesion strength between each of the layers. In other words, it is preferable that at least one softening temperature of the core layer 12 be higher than any of the softening temperatures of the first skin layer 11*a* and the second skin layer 13. In addition, regarding the softening temperatures of the first skin layer 11*a* and the second skin layer 13, it is preferable that the softening temperature of the first skin layer 11*a* be higher than the softening temperature of the second skin layer 13, because then it is easy to maintain a balance between the barrier properties after the heat sterilization treatment and the adhesion between each of the layers. In other words, it is preferable that at least one softening temperature of the first skin layer 11*a* be higher than any of the softening temperatures of the second skin layer 13.

The softening temperature of the core layer 12, which is 190° C. or higher, may be higher than the softening temperature of the first skin layer 11*a*, which is 120° C. or higher, by 10° C. or more, or 20° C. or more. In this case, the shrinkage of the base material layer 1*a* in the heat sterilization treatment can be further reduced, and the adhesion strength between each of the layers after the heat sterilization treatment can be more sufficiently maintained.

The softening temperature of the core layer 12, which is 190° C. or higher, may be higher than the softening temperature of the second skin layer 13, which is 160° C. or lower, by 35° C. or more, or 45° C. or more. In this case, the shrinkage of the base material layer 1*a* in the heat sterilization treatment can be further reduced, and the adhesion strength between each of the layers after the heat sterilization treatment can be more sufficiently maintained.

The softening temperature of the first skin layer 11*a*, which is 120° C. or higher, may be higher than the softening temperature of the second skin layer 13, which is 160° C. or lower, by 5° C. or more, or 15° C. or more. In this case, it is easier to maintain a balance between the barrier properties after the heat sterilization treatment and the adhesion between each of the layers.

A method of adjusting the softening temperatures of the first skin layer 11*a*, the core layer 12, and the second skin layer 13 is not particularly limited. The softening temperature of each of the layers can be adjusted by the type of resin constituting each of the layers, a mixing ratio of resins when using multiple resins, a monomer ratio when using a copolymer, a production method of each of the layers, and the like, for example.

The thickness of each of the first skin layer 11*a* and the second skin layer 13 may be 0.1 μm or more. When this thickness is 0.1 μm or more, the first skin layer 11*a*, the core layer 12, and the second skin layer 13 can be evenly laminated, which makes it possible to suppress variations in the thickness of the first skin layer 11*a* and the second skin layer 13. It is also thought that stress on the vapor deposition layer at the time of the heat sterilization treatment can be sufficiently alleviated, which makes it possible to prevent a deterioration of barrier properties. From this viewpoint, the thickness of the first skin layer 11*a* and the second skin layer 13 is preferably 0.3 μm or more. Meanwhile, the upper limit value of the thickness of the first skin layer 11*a* and the second skin layer 13 is not particularly limited, but from the viewpoint of ensuring more sufficient heat resistance of the entire base material layer 1*a*, the upper limit value is preferably 2.0 μm or less, and more preferably 1.8 μm or less.

The thickness of the core layer 12 may be 2 μm or more, 10 μm or more, or 15 μm or more, and may be 150 μm or less, 50 μm or less, or 20 μm or less.

The ratio of the thickness of the first skin layer 11*a* to the thickness of the core layer 12 (thickness of first skin layer 11*a*/thickness of core layer 12) may be 1/100 to 1/5, or may be 1/70 to 1/10. When the ratio of the thickness is within the above-mentioned range, the heat resistance of the entire base material layer 1*a* can be more sufficiently ensured, and also, the adhesion between each of the layers in the barrier film and a laminate can be further improved.

The ratio of the thickness of the second skin layer 13 to the thickness of the core layer 12 (thickness of second skin layer 13/thickness of core layer 12) may be 1/100 to 1/5, or may be 1/70 to 1/10. When the ratio of the thickness is within the above-mentioned range, the heat resistance of the entire base material layer 1*a* can be more sufficiently ensured, and also, the adhesion between each of the layers in the barrier film and a laminate can be further improved.

The thicknesses of the first skin layer 11*a* and the thickness of the second skin layer 13 may be the same as or different from each other. The thickness of the first skin layer 11*a* may be equal to or less than the thickness of the second skin layer 13. The ratio of the thickness of the first skin layer 11*a* to the thickness of the second skin layer 13 (thickness of first skin layer 11*a*/second skin layer 13) may be 1/5 to 1/0.5, and may be 1/3 to 1/1. When the ratio of the thickness is within the above-mentioned range, the heat resistance of the entire base material layer 1*a* can be more sufficiently ensured, and also, the adhesion between each of the layers in the barrier film and a laminate can be further improved.

As polypropylene (including a copolymer of propylene and other monomers) used for the base material layer 1*a*, a recycled resin may be used, or a resin obtained by polymerizing raw materials derived from biomass such as plants may also be used. When these resins are used, they may be used alone, or may be used by being mixed with resins polymerized from ordinary fossil fuels.

[Cross-Section Processing Method of Softening Temperature Measurement Sample]

In softening temperature measurement of the base material layer of the present embodiment, the softening temperature measurement of each of the layers is performed from the cross section of the base material layer. The front and back surfaces of the base material layer may be subjected to a corona treatment as a surface treatment in order to prevent peeling between an embedded resin and the base material layer after embedding. A sample used for the softening temperature measurement is not needed to be in the state of only the base material layer, and a sample in the state of a barrier film or a laminate may also be used.

After surface-treating the front and back surfaces of the base material layer, the base material layer is cut with a razor into a strip shape or a wedge shape, and then embedded. A photocurable resin is used as a resin for embedding, and is cured by light irradiation after embedding. As the photocurable resin, for example, D-800 (trade name) manufactured by Toagosei Co., Ltd. can be used. Next, the sample embedded resin after curing is fixed with an AFM sample holder insert, and trimming and cutting of the cross section of the base material layer is performed with a glass knife at room temperature (25° C.). Thereafter, cross section cutting is performed with a diamond knife at a low temperature (−140° C.) until a mirror surface is obtained. Cross section cutting with a diamond knife can be performed by setting a cutting speed to 1.0 mm/s and a cutting film thickness to 100 nm, for example. The cross-sectioned sample is used for the softening temperature measurement in the state of being fixed with the AFM sample holder insert. As a cross section cutting device, it is possible to use an Ultramicrotome EM UC7 (trade name) and a Cryosystem EM FC7 (trade name) which are manufactured by Leica Microsystems GmbH, for example. Furthermore, a cutting orientation is in a direction parallel to the layer interface.

[Softening Temperature Measurement Method]

A softening temperature is a temperature at which a substance such as a resin exhibits softening behavior. In the present embodiment, a softening temperature is evaluated using local thermal analysis (LTA) in which an atomic force microscope is used, and a sample is heated by applying a voltage to a cantilever having a heater. In local thermal analysis (LTA), after measuring the shape of a measurement sample, a constant force (contact pressure) is applied to the sample surface using a cantilever at a predetermined location on the sample, and heating is performed while keeping the contact pressure constant to calculate, as a softening temperature, a temperature at which a height position (Z displacement) of the cantilever changes due to the change in hardness of the sample surface before and after heating. A change in the height position of the cantilever refers to a change caused by rising of a position in a vertical direction of the cantilever due to thermal expansion of the sample surface, and by falling of a position in the vertical direction of the cantilever due to softening of the sample surface. When a voltage applied to the heater of the cantilever when such a change occurs in the height position of the cantilever is converted into a temperature, it is possible to know a local softening temperature in a nanoscale region and a softening temperature near the surface.

As an apparatus, MFP-3D-SA (trade name) as an atomic force microscope (AFM) and Ztherm as a local thermal analysis option, which are manufactured by Oxford Instruments plc, are used. AC mode (tapping mode) is used for shape measurement, and contact mode is used for softening temperature measurement.

As a cantilever, AN2-200 (trade name) manufactured by Anasys Instruments Corporation, which has a spring constant of 0.5 to 3.5 N/m, is used.

A voltage application rate (temperature rising rate) to the cantilever in measuring the softening temperature is 0.5 V/second.

In Ztherm, the contact pressure of the cantilever (amount of change in amount of deflection of cantilever) is constantly controlled to perform measurement. However, because the amount of deflection of the cantilever changes depending on the applied voltages even without contacting the sample, it is required to control the contact pressure after subtracting the amount of deflection of the cantilever due to an applied voltage. Ztherm has a detrend correction function that acquires changes in the amount of deflection of the cantilever with respect to an applied voltage, and performs detrend correction by applying a maximum applied voltage used for measurement to the cantilever in the state where the cantilever is not in contact with the sample surface. In the present embodiment, after the shape measurement and before the softening temperature measurement, detrend correction is performed at a maximum applied voltage used for measurement and at a voltage application rate (temperature rising rate) of 0.5 V/second, and then the measurement is performed. The contact pressure is set to 0.2 V.

The set value of the amount of falling displacement of the cantilever for stopping the measurement is 30 nm.

A point at which the height (Z displacement) in the vertical direction of the cantilever is maximum is defined as a softening point, and an applied voltage at this point is read.

A calibration curve of an applied voltage and a melting point (melt peak temperature) is created to convert the voltage applied to the heater of the cantilever into a softening temperature. As samples for calibration, samples for which a melting point (melt peak temperature) has already been measured with a differential scanning calorimeter (DSC) are used. The softening temperature measurement is performed on each of the samples for calibration while changing measurement positions, and an average value of the applied voltage at the softening point and the melting point (melt peak temperature) are approximated with a cubic function using the least squares method to create a standard curve, which is used as a calibration curve. The samples for calibration are polycaprolactone pellets (melting point: 60° C.), low-density polyethylene pellets (melting point: 112° C.), polypropylene pellets (melting point: 166° C.), and a biaxially stretched polyethylene terephthalate film (melting point: 255° C.). For each of the samples, cross section samples produced in an environment below a glass transition temperature are used. The cross section samples are produced using an ultramicrotome and a cryosystem, and cross section cutting is performed in an environment of −80° C. for polycaprolactone, −140° C. for low-density polyethylene, −40° C. for polypropylene, and 25° C. (room temperature) for polyethylene terephthalate.

Using this calibration curve of the applied voltage and the melting point (melt peak temperature), the applied voltage at the softening point is converted into a temperature, which is defined as the softening temperature.

[Vapor Deposition Layer]

The vapor deposition layer is provided on the above-mentioned base material layer from the viewpoint of improving gas barrier properties with respect to water vapor and oxygen, and is preferably transparent. The vapor deposition layer contains an inorganic oxide, and as the inorganic oxide, it is possible to use aluminum oxide, silicon oxide, tin oxide, magnesium oxide, or a mixture thereof, for example. When considering heat sterilization resistance, it is more preferable to use at least one selected from aluminum oxide and silicon oxide among them from the viewpoint of suppressing oxygen permeability to a lower level even after the heat sterilization treatment, and from the viewpoint of maintaining a sufficient adhesion strength between films even after the heat sterilization treatment.

The thickness of the vapor deposition layer may be 5 to 300 nm. When the thickness of the vapor deposition layer is 5 nm or more, it is easy to obtain a film having a uniform and sufficient film thickness, which makes it possible to sufficiently exhibit the function as a gas barrier film. Furthermore, when the thickness of the vapor deposition layer is 300 nm or less, flexibility can be imparted to the vapor deposition layer, and cracks are unlikely to occur in the vapor deposition layer even when external factors such as folding or tensioning are applied after film formation. From these viewpoints, the thickness of the vapor deposition layer is preferably 6 nm or more, and more preferably 8 nm or more, and is preferably 150 nm or less, and more preferably 100 nm or less.

The vapor deposition layer can be formed by an ordinary vacuum vapor deposition method. It is also possible to use other thin film formation methods such as a sputtering method, an ion plating method, and a plasma vapor deposition (CVD) method. However, when considering productivity, a vacuum vapor deposition method is currently the best method. As heating means for a vacuum vapor deposition method, it is preferable to use any of an electron beam heating method, a resistance heating method, and an induction heating method, but considering the wide range of selectivity of evaporation materials, it is more preferable to use an electron beam heating method. In addition, it is also possible to perform vapor deposition using a plasma assisted method or an ion beam assisted method in order to improve the adhesion between the vapor deposition layer and the base material layer, and the denseness of the vapor deposition layer. Furthermore, in order to increase the transparency of a vapor deposition film, reactive vapor deposition in which various gases such as oxygen are blown thereinto when performing vapor deposition may be used.

In order to improve the adhesion between the base material layer and the vapor deposition layer, surface treatments such as a plasma treatment and a corona treatment may be performed on the surface of the base material layer which is on the vapor deposition layer side, or alternatively, an anchor coat layer (not shown in the drawings) may be provided between the base material layer and the vapor deposition layer. By providing the anchor coat layer, it is possible to further improve adhesion, barrier properties, and the like after the heat sterilization treatment. Examples of coating agents for providing the anchor coat layer include an acrylic resin, an epoxy resin, an acrylic urethane-based resin, a polyester-based polyurethane resin, and a polyether-based polyurethane resin. Among these coating agents, an acrylic urethane resin and a polyester-based polyurethane resin are preferable from the viewpoint of heat resistance and interlaminar adhesive strength.

[Gas Barrier Layer]

The gas barrier layer is provided for the purpose of protecting the vapor deposition layer and supplementing barrier properties. The gas barrier layer may be formed from a coating liquid containing a silicon compound or a hydrolyzate thereof and a water-soluble polymer having a hydroxyl group. Furthermore, the gas barrier layer may be formed from a coating liquid containing a water-soluble polymer having a hydroxyl group and at least one selected from the group consisting of a metal alkoxide, a silane coupling agent, and a hydrolysate thereof.

Examples of water-soluble polymers having a hydroxyl group include polyvinyl alcohol, polyvinylpyrrolidone, starch, methyl cellulose, carboxymethyl cellulose, and sodium alginate. In particular, it is preferable to use polyvinyl alcohol (PVA) as a coating agent because then gas barrier properties are better.

It is preferable that a silicon compound be at least one selected from $Si(OR^1)_4$ and $R^2Si(OR^3)_3$ (where $OR^1$ and $OR^3$ are each independently a hydrolyzable group, and $R^2$ is an organic functional group), for example. As $Si(OR^1)_4$, it is preferable to use tetraethoxysilane ($Si(OC_2H_5)_4$). Tetraethoxysilane is preferably used because it is relatively stable in an aqueous solvent after hydrolysis. Furthermore, $R^2$ in $R^2Si(OR^3)_3$ is preferably selected from a vinyl group, an epoxy group, a methacryloxy group, a ureido group, and an isocyanate group.

Examples of metal alkoxides include a compound represented by the following general formula.

$$M(OR^{11})_m(R^{12})_{n-m} \tag{1}$$

In Formula (1) above, $R^{11}$ and $R^{12}$ are each independently a monovalent organic group having 1 to 8 carbon atoms, and are preferably an alkyl group such as a methyl group and an ethyl group. M represents an n-valent metal atom such as Si, Ti, Al, and Zr. m is an integer of 1 to n. When there are a plurality of $R^{11}$'s and $R^{12}$'s, $R^{11}$'s and $R^{12}$'s may be the same as or different from each other.

Specific examples of metal alkoxides include tetraethoxysilane ($Si(OC_2H_5)_4$) and triisopropoxyaluminum ($Al(O\text{-}2'\text{-}C_3H_7)_3$). Tetraethoxysilane and triisopropoxyaluminum are preferable because they are relatively stable in an aqueous solvent after hydrolysis.

Examples of silane coupling agents include a compound represented by the following general formula.

$$Si(OR^{21})_p(R^{22})_{3-p}R^{23} \tag{2}$$

In Formula (2) above, $R^{21}$ represents an alkyl group such as a methyl group or an ethyl group; $R^{22}$ represents a monovalent organic group such as an alkyl group, an aralkyl group, an aryl group, an alkenyl group, an alkyl group substituted with an acryloxy group, or an alkyl group substituted with a methacryloxy group; $R^{23}$ represents a monovalent organic functional group, and p represents an integer of 1 to 3. When there are a plurality of $R^{21}$'s and $R^{22}$'s, $R^{21}$'s and $R^{22}$'s may be the same as or different from each other. Examples of monovalent organic functional groups represented by $R^{23}$ includes a glycidyloxy group, an epoxy group, a mercapto group, a hydroxyl group, an amino group, an alkyl group substituted with a halogen atom, or a monovalent organic functional group containing an isocyanate group. Compounds obtained by forming these silane coupling agents into multimers such as dimers and trimers may be used.

Specific examples of silane coupling agents include silane coupling agents such as vinyltrimethoxysilane, γ-chloropropylmethyldimethoxysilane, γ-chloropropyltrimethoxysilane, 3-glycidoxypropylmethyldimethoxysilane, 3-glycidoxypropyltrimethoxysilane, 3-glycidoxypropylmethyldiethoxysilane, 3-glycidoxypropylmethyltriethoxysilane, γ-methacryloxypropyltrimethoxysilane, and γ-methacryloxypropylmethyldimethoxysilane.

The gas barrier layer can be formed by directly mixing a dissolved substance obtained by dissolving a water-soluble polymer in water or a water/alcohol mixed solvent with a silicon compound, a metal alkoxide, a silane coupling agents, or the like, or mixing the above-mentioned dissolved substance with a product obtained by previously subjecting a silicon compound, a metal alkoxide, a silane coupling agents, or the like to a treatment such as hydrolysis, coating this mixed solution on the above-mentioned vapor deposition layer, and thereafter heating to dry. As necessary, it is also possible to add an isocyanate compound, or known additives such as a dispersant, a stabilizer, a viscosity adjuster, and a colorant to this solution within a range not impairing gas barrier properties.

When PVA is used as the water-soluble polymer, the ratio of PVA in the mixed solution is preferably 20% by mass or more and 50% by mass or less, and more preferably 25% by mass or more and 40% by mass or less in terms of mass ratio, based on the total solid content of the mixed solution. When the ratio of PVA is 20% by mass or more, the flexibility of a film is maintained, making it easier to form the gas barrier layer. Meanwhile, when the ratio of PVA is 50% by mass or less, more sufficient gas barrier properties can be imparted to the barrier film.

The thickness of the gas barrier layer may be 0.05 μm or more, or 0.1 μm or more, and may be 10 μm or less, or 1 μm or less.

<Barrier Film According to Second Aspect>

A barrier film according to the second aspect is a barrier film containing, in the following order: a base material layer containing polypropylene; a vapor deposition layer containing an inorganic oxide; and a gas barrier layer, in which the base material layer has two layers, which are a skin layer and a core layer, in order from the vapor deposition layer, and in which, when a softening temperature of each of the layers of the base material layer is measured by local thermal analysis (LTA), at least one softening temperature of the skin layer is 115° C. or higher and 170° C. or lower, and at least one softening temperature of the core layer is 190° C. or higher.

Figure 2:
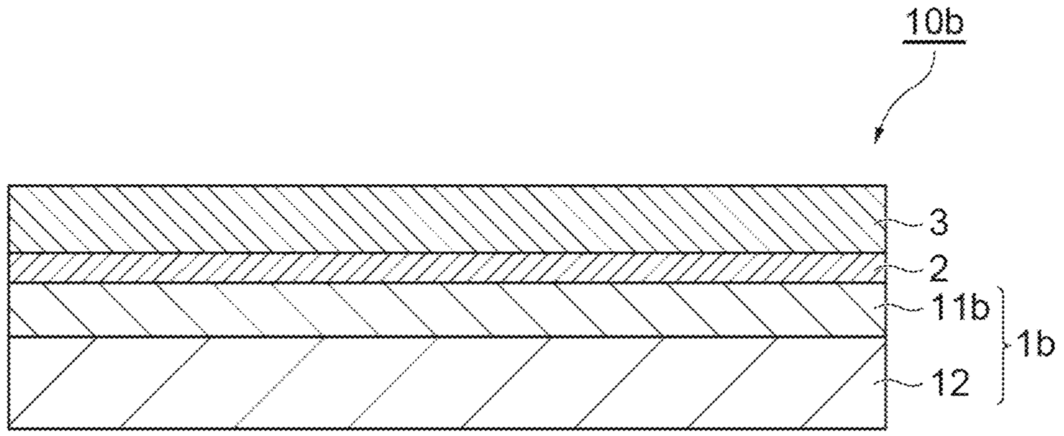
FIG. 2 is a schematic cross-sectional view showing a barrier film according to one embodiment of the present disclosure.

FIG. 2 is a schematic cross-sectional view showing a barrier film according to the second aspect of the present embodiment. As shown in FIG. 2, a barrier film 10*b* according to the present embodiment has a base material layer 1*b*, a vapor deposition layer 2, and a gas barrier layer 3 in this order.

[Base Material Layer]

The base material layer 1*b* is a film (base film) serving as a support, and contains polypropylene. The base material layer 1*b* is a film having a multilayer structure in which two layers, which are a skin layer 11*b* and a core layer 12, are provided in order from the vapor deposition layer side. The base material layer 1*b* may be a film made of polypropylene, or may be a film obtained by forming polypropylene into a sheet, and stretching the sheet by ordinary means to uniaxially or biaxially orient the sheet. Stretching may be performed on a film having a multilayer structure. Known additives may be added to the base material layer 1*b* depending on the purpose. Examples of the known additives include inorganic additives such as antioxidants; stabilizers; lubricants such as calcium stearate, fatty acid amide, and erucic acid amide; organic additives such as antistatic agents; and particulate lubricants such as silica, zeolite, thyroid, hydrotalcite, and silicon particles.

The thickness (total thickness) of the base material layer 1*b* is not particularly limited, but may be 3 μm or more and 200 μm or less, 6 μm or more and 50 μm or less, or 10 μm or more and 30 μm or less, for example.

The skin layer 11*b* is a layer in which at least one softening temperature is 115° C. or higher and 170° C. or lower, when a softening temperature is measured from a cross section of the film by local thermal analysis (LTA) to be described later. The above-mentioned at least one softening temperature may be 120° C. or higher, 125° C. or higher, or 130° C. or higher from the viewpoint of improving heat resistance, and may be 165° C. or lower, or 160° C. or lower from the viewpoint of imparting flexibility. As the softening temperature, a temperature measured at the center portion of the skin layer 11*b* in a thickness direction is used. When the above-mentioned at least one softening temperature is 115° C. or higher, the heat resistance of the skin layer 11*b* is not too low, and there is little risk of causing a degradation in adhesion and a deterioration in barrier properties due to softening of the skin layer 11*b* at the time of the heat sterilization treatment. Furthermore, when the above-mentioned at least one softening temperature is 170° C. or lower, a degradation in flexibility of the skin layer 11*b* can be prevented, which makes it possible to increase the adhesion strength between the skin layer 11*b* and the core layer 12. The skin layer 11*b* may be a layer having one softening temperature or may be a layer having multiple softening temperatures. When the skin layer 11*b* has multiple softening temperatures, it is sufficient for at least one softening temperature to satisfy the above-mentioned conditions.

Polypropylene used for the skin layer 11*b* may include a copolymer of propylene and other monomers from the viewpoint of improving adhesion to the core layer 12. As other monomers, for example, α-olefins such as ethylene, 1-butene, and 1-hexene may be used. The skin layer 11*b* may contain a copolymer of propylene and α-olefin. The copolymer may be a random copolymer. Polypropylene used for the skin layer 11*b* may contain a random copolymer of propylene and two or more types of α-olefins, or may contain an ethylene-1-butene-propylene random copolymer from the viewpoint of suppressing oxygen permeability to a lower level even after the heat sterilization treatment, and from the viewpoint of maintaining a sufficient adhesion strength between films even after the heat sterilization treatment.

The content of ethylene in the polypropylene used for the skin layer 11*b* may be 1% by mass or more, 1.5% by mass or more, or 2% by mass or more, and may be 7% by mass or less, 6% by mass or less, 5% by mass or less, 4% by mass or less, or 3.5% by mass or less based on the total amount of the polypropylene, from the viewpoint of suppressing oxygen permeability to a lower level even after the heat sterilization treatment, and from the viewpoint of maintaining a sufficient adhesion strength between films even after the heat sterilization treatment.

The content of 1-butene in the polypropylene used for the skin layer 11*b* may be 1% by mass or more, 1.5% by mass or more, or 2% by mass or more, and may be 5% by mass or less, 4% by mass or less, or 3.5% by mass or less based on the total amount of the polypropylene, from the viewpoint of suppressing oxygen permeability to a lower level even after the heat sterilization treatment.

The thickness of the skin layer 11*b* may be 0.2 μm or more. When the thickness of the skin layer 11*b* is 0.2 μm or more, the skin layer 11*b* and the core layer 12 can be evenly laminated. Furthermore, it is possible to suppress oxygen permeability to a lower level even after the heat sterilization treatment, and maintain a more sufficient adhesion strength between films even after the heat sterilization treatment. From these viewpoints, the thickness of the skin layer 11*b* is preferably 0.3 μm or more. Meanwhile, the upper limit value of the thickness of the skin layer 11*b* is not particularly limited, but from the viewpoint of ensuring more sufficient heat resistance of the entire base material layer 1*b*, the upper limit value is preferably 2.0 μm or less, and more preferably 1.8 μm or less. The thickness of the skin layer 11*b* may be 0.2 μm or more and 2.0 μm or less, or 0.3 μm or more and 1.8 μm or less.

The core layer 12 is a layer in which at least one softening temperature is 190° C. or higher, when a softening temperature is measured from a cross section of the film by local thermal analysis (LTA) to be described later. The above-mentioned at least one softening temperature may be 195° C. or higher, 200° C. or higher, 205° C. or higher, or 210° C. or higher, and may be 220° C. or lower, 215° C. or lower, or 210° C. or lower. As the softening temperature, a temperature measured at the center portion of the core layer 12 in a thickness direction is used. When the above-mentioned at least one softening temperature is 190° C. or higher, the heat resistance of the base material layer 1*b* can be increased, which leads to heat resistance at the time of a heat sterilization treatment, and this can prevent a problem of making it not possible to use as a packaging material due to shrinkage of the base material layer 1*b* at the time of the heat sterilization treatment. The core layer 12 may be a layer having one softening temperature or may be a layer having multiple softening temperatures. When the core layer 12 has multiple softening temperatures, it is sufficient for at least one softening temperature to satisfy the above-mentioned conditions.

Polypropylene used for the core layer 12 may be crystalline polypropylene from the viewpoint of increasing the heat resistance of the base material layer 1*b*, and may be homopolypropylene, which is a homopolymer of propylene, from the viewpoint of further improving the heat resistance for the heat sterilization treatment. However, a random copolymer of propylene and α-olefin, a mixture of this copolymer and homopolypropylene, or the like may also be used as long as the effects of the present disclosure are not significantly impaired.

The softening temperature of the core layer 12, which is 190° C. or higher, may be higher than the softening temperature of the skin layer 11*b*, which is 115° C. or higher and 170° C. or lower, by 20° C. or more, 40° C. or more, or 50° C. or more. In this case, the shrinkage of the base material layer 1*b* in the heat sterilization treatment can be further reduced, and the adhesion strength between each of the layers after the heat sterilization treatment can be more sufficiently maintained.

The thickness of the core layer 12 may be 2 μm or more, 10 μm or more, or 15 μm or more, and may be 150 μm or less, 50 μm or less, or 20 μm or less.

The ratio of the thickness of the skin layer 11*b* to the thickness of the core layer 12 (thickness of skin layer 11*b*/thickness of core layer 12) may be 1/100 to 1/5, 1/80 to 1/8, or 1/70 to 1/10. When the ratio of the thickness is within the above-mentioned range, the heat resistance of the entire base material layer 1*b* can be more sufficiently ensured, and also, it is possible to suppress oxygen permeability to a lower level even after the heat sterilization treatment, and maintain a more sufficient adhesion strength between films even after the heat sterilization treatment.

The base material layer 1*b* constituted of only two layers, which are the skin layer 11*b* and the core layer 12. The skin layer 11*b* and the core layer 12 are in contact with each other without any other layer therebetween. Both surfaces of the base material layer 1*b* are formed from the skin layer 11*b* and the core layer 12.

A method of adjusting the softening temperatures of the skin layer 11*b* and the core layer 12 is not particularly limited. The softening temperature of each of the layers can be adjusted by the type of resin constituting each of the layers, a mixing ratio of resins when using multiple resins, a monomer ratio (for example, ethylene content) when using a copolymer, a production method (for example, stretching conditions) of each of the layers, and the like, for example.

As polypropylene (including a copolymer of propylene and other monomers) used for the base material layer 1*b*, a recycled resin may be used, or a resin obtained by polymerizing raw materials derived from biomass such as plants may also be used. When these resins are used, they may be used alone, or may be used by being mixed with resins polymerized from ordinary fossil fuels.

The softening temperature measurement of the base material layer of the present embodiment is carried out by the same method as that of the softening temperature measurement described in the above-mentioned first aspect.

[Vapor Deposition Layer]

The vapor deposition layer of the present embodiment can be constituted of the same configuration as that of the vapor deposition layer described in the above-mentioned first aspect.

[Gas Barrier Layer]

The gas barrier layer of the present embodiment can be constituted of the same configuration as that of the gas barrier layer described in the above-mentioned first aspect.

<Laminate>

Figure 3:
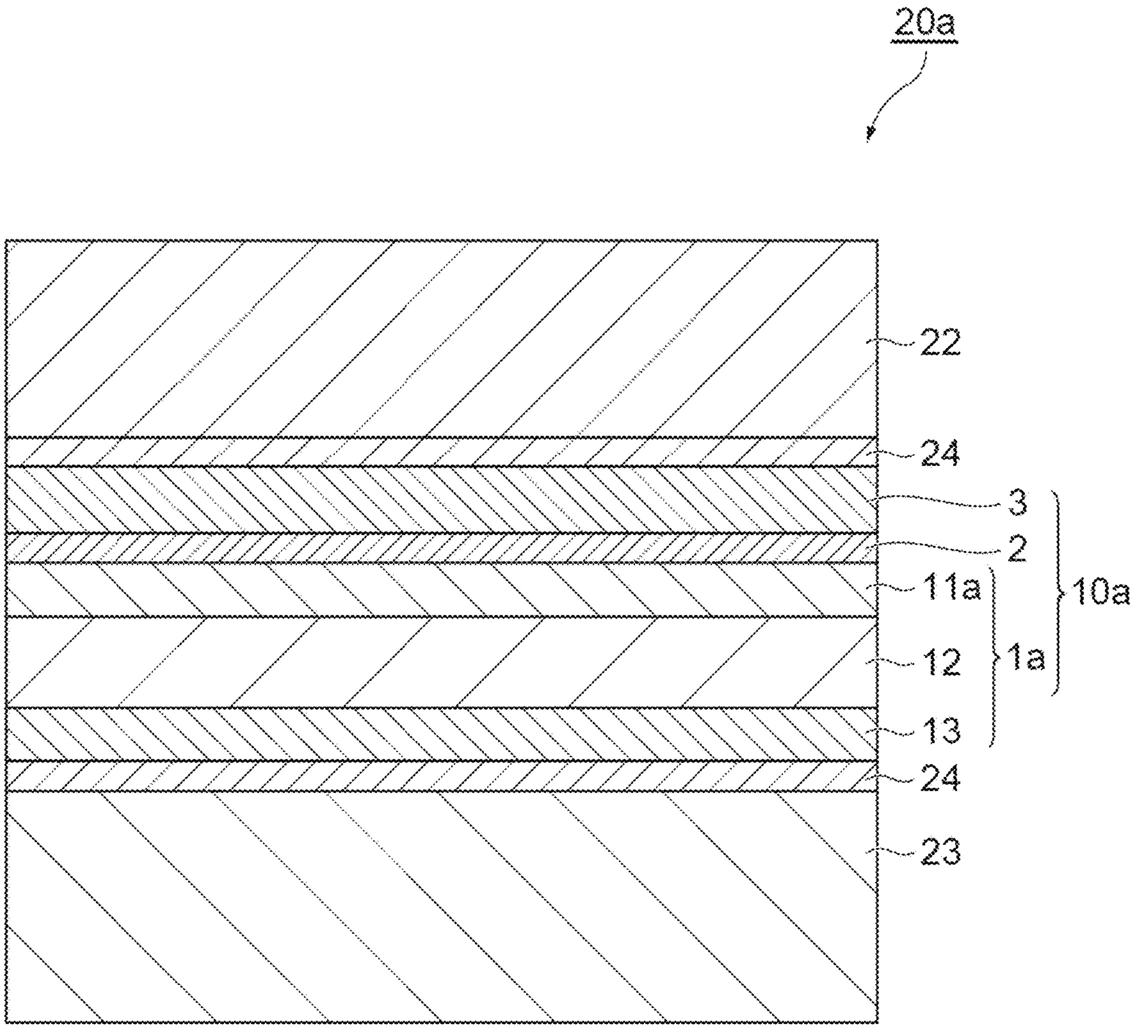
FIG. 3 is a schematic cross-sectional view showing a laminate according to one embodiment of the present disclosure.
Figure 4:
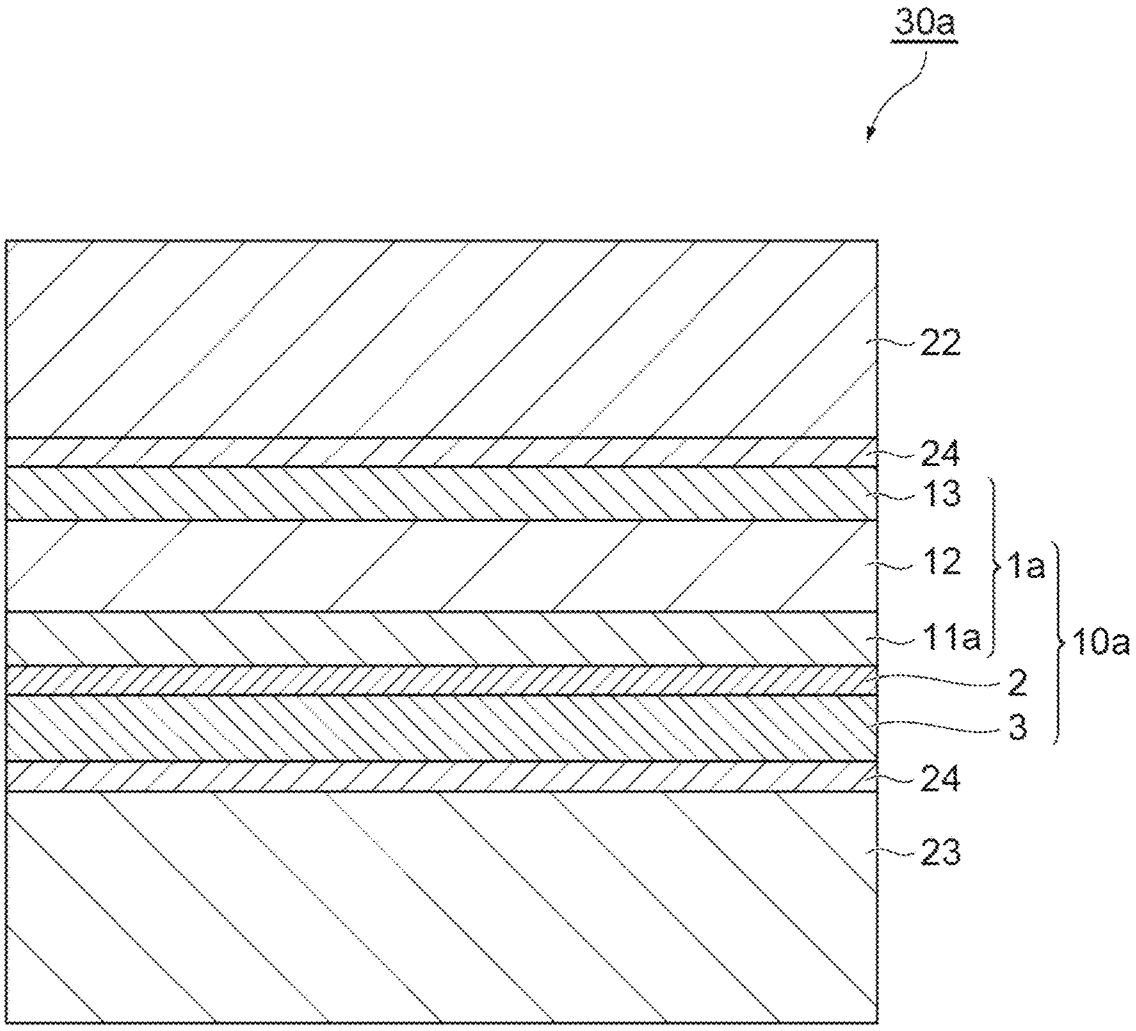
FIG. 4 is a schematic cross-sectional view showing a laminate according to one embodiment of the present disclosure.

FIG. 3 and FIG. 4 are schematic cross-sectional view each showing a laminate according to the first aspect of the present embodiment. As shown in FIG. 3 and FIG. 4, laminates 20*a* and 30*a* according to the present embodiment have a structure in which a second base material layer (outer layer film) 22 and a sealant layer 23 are laminated with an adhesive layer 24 on both surfaces of the above-mentioned barrier film 10*a* therebetween. In the laminate 20*a* shown in FIG. 3, the second base material layer 22 is laminated on the gas barrier layer 3 of the barrier film 10*a*, and the sealant layer 23 is laminated on the second skin layer 13 of the barrier film 10*a*. In the laminate 30*a* shown in FIG. 4, the second base material layer 22 is laminated on the second skin layer 13 of the barrier film 10*a*, and the sealant layer 23 is laminated on the gas barrier layer 3 of the barrier film 10*a*.

Figure 5:
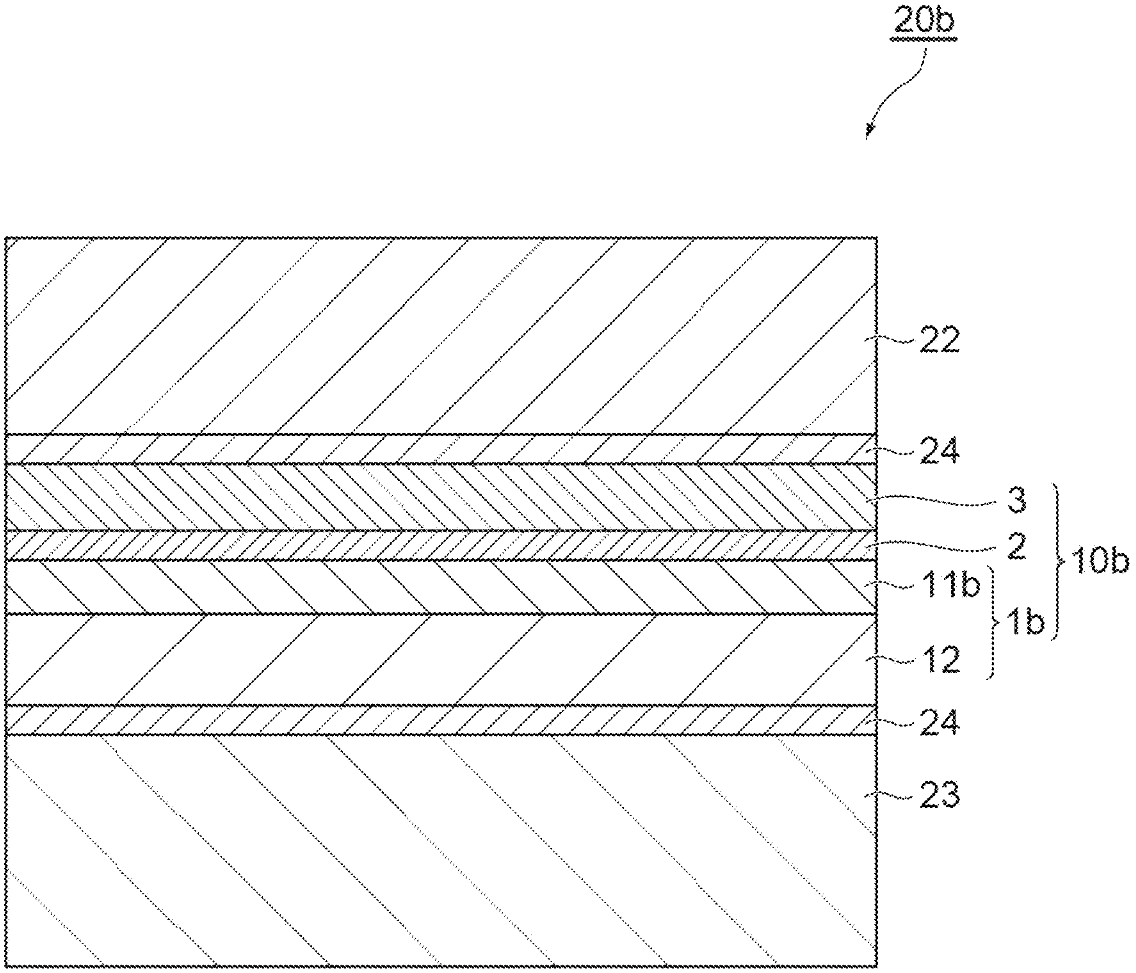
FIG. 5 is a schematic cross-sectional view showing a laminate according to one embodiment of the present disclosure.
Figure 6:
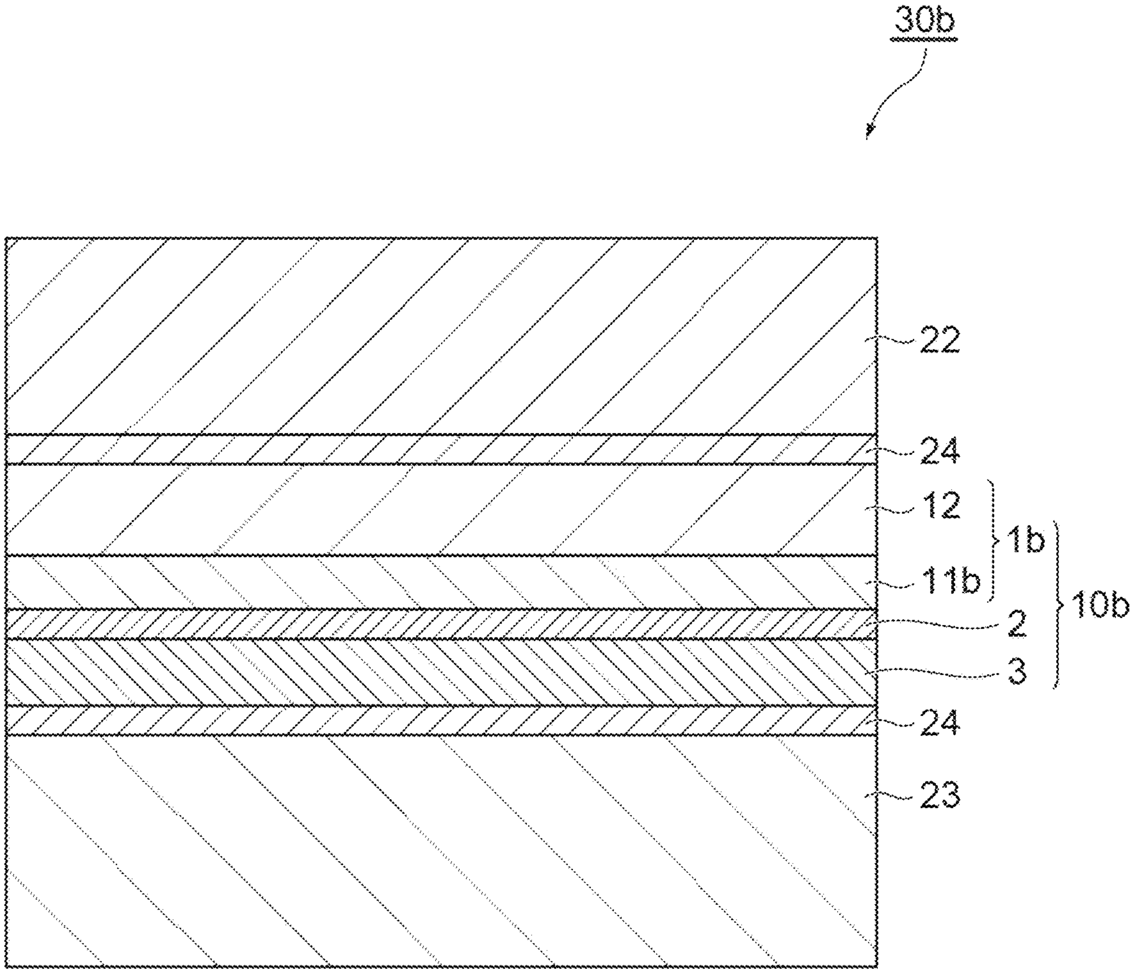
FIG. 6 is a schematic cross-sectional view showing a laminate according to one embodiment of the present disclosure.

FIG. 5 and FIG. 6 are schematic cross-sectional view each showing a laminate according to the second aspect of the present embodiment. As shown in FIG. 5 and FIG. 6, laminates 20*b* and 30*b* according to the present embodiment have a structure in which the second base material layer (outer layer film) 22 and the sealant layer 23 are laminated with the adhesive layer 24 on both surfaces of the above-mentioned barrier film 10*b* therebetween. In the laminate 20*b* shown in FIG. 5, the second base material layer 22 is laminated on the gas barrier layer 3 of the barrier film 10*b*, and the sealant layer 23 is laminated on the core layer 12 of the barrier film 10*b*. In the laminate 30*b* shown in FIG. 6, the second base material layer 22 is laminated on the core layer 12 of the barrier film 10*b*, and the sealant layer 23 is laminated on the gas barrier layer 3 of the barrier film 10*b*.

In order to use the laminates 20*a*, 30*a*, 20*b*, and 30*b* as mono-material packaging materials, polyolefin is used as the material for the second base material layer 22 and sealant layer 23, but it is preferable to use polypropylene as in the case of the base material layers 1*a* and 1*b* of the barrier films 10*a* and 10*b*. As polypropylene used for the second base material layer 22, for example, it is possible to use a film obtained by stretching homopolypropylene to impart heat resistance. As the sealant layer 23, for example, a stretched or unstretched polypropylene film may be used.

The thickness of the second base material layer 22 is not particularly limited, but may be 15 μm or more, and may be 200 μm or less, for example.

The thickness of the sealant layer 23 is not particularly limited, but may be 15 μm or more, and may be 200 μm or less, for example.

The adhesive layer 24 is for adhering each of the films together. Examples of adhesives constituting the adhesive layer 24 include polyurethane resins in which a difunctional or higher-functional isocyanate compound is acted to a base material such as polyester polyol, polyether polyol, acrylic polyol, and carbonate polyol. For various polyols, one type may be used alone, or two or more types may be used in combination. In the adhesive layer 24, for the purpose of promoting adhesion, a carbodiimide compound, an oxazoline compound, an epoxy compound, a phosphorus compound, a silane coupling agent, or the like may be blended in the above-mentioned polyurethane resin. The application amount of the adhesive constituting the adhesive layer 24 may be 0.5 to 10 $g/m^2$, for example, from the viewpoint of obtaining a desired adhesive strength, followability, workability, and the like. For the adhesive layer 24, from the viewpoint of environmental consideration, a material whose polymer component is derived from biomass, or a material having biodegradability may be used. Furthermore, an adhesive having barrier properties may be used for the adhesive layer 24.

<Packaging Bag>

A packaging bag can be produced using the above-mentioned laminate. The packaging bag may be made into a bag shape by folding one packaging material in half such that the sealant layers face each other, and thereafter heat-sealing three sides, or may be made into a bag shape by overlapping two packaging materials such that the sealant layers face each other, and thereafter heat-sealing four sides. The packaging bag can accommodate contents such as foods and drugs, as contents. Furthermore, the packaging bag may have a shape having a bent portion (folded portion), such as a stand-up pouch. The packaging bag according to the present embodiment can maintain high gas barrier properties even when it has a shape having a bent portion.

EXAMPLES

Hereinafter, the present disclosure will be explained in more detail with reference to examples, but the present disclosure is not limited to these examples.

Example 1-1

An ethylene-1-butene-propylene random copolymer resin was used as the material for the first skin layer, a homopolypropylene resin was used as the material for the core layer, and an ethylene-propylene random copolymer resin was used as the material for the second skin layer. After co-extruding these resins, biaxial stretching was performed to produce a base material film (base material layer) having a total thickness of 20 μm. Each of the thicknesses of the first skin layer and the second skin layer was 0.7 μm, and the thickness of the core layer was 18.6 μm. Table 1 shows the softening temperature of each of the layers.

Subsequently, by gravure coating, an acrylic primer solution was applied onto the first skin layer of the base material layer and dried to form an anchor coat layer having a thickness of 0.1 μm. Subsequently, a vapor deposition layer composed of an inorganic oxide was formed by vapor-depositing a thin film of silicon oxide having a thickness of 30 nm on the anchor coat layer by reactive vapor deposition using radio frequency excited ion plating in an oxygen atmosphere under reduced pressure.

Subsequently, tetraethoxysilane (hereinafter referred to as "TEOS"), methanol, and 0.1 N hydrochloric acid were mixed in a mass ratio of 45/15/40 to obtain a TEOS hydrolyzed solution. Three solutions were mixed to prepare a coating solution. The three solutions were: the TEOS hydrolyzed solution, an aqueous solution of 5% by mass of polyvinyl alcohol (hereinafter referred to as "PVA"), and a solution in which 1,3,5-tris(3-methoxysilylpropyl) isocyanurate was diluted with a water/IPA (isopropyl alcohol)=1/1 solution to a solid content of 5% by mass (in terms of $R^2Si(OH)_3$). The coating solution was prepared such that the mass ratio of the $SiO_2$ solid content (converted value) of TEOS, the $R^2Si(OH)_3$ solid content (converted value) of isocyanurate silane, and the PVA solid content was 40/5/55. This coating solution was applied onto the vapor deposition layer by gravure coating, and thereafter dried under conditions of 80° C. and 60 seconds to form a gas barrier layer having a thickness of 0.3 μm. In this manner, a barrier film of Example 1-1 having a laminated structure of gas barrier layer/vapor deposition layer/anchor coat layer/first skin layer/core layer/second skin layer was obtained.

Example 1-2

A barrier film was obtained in the same manner as in Example 1-1 except that an ethylene-1-butene-propylene random copolymer resin was used as the material for the first skin layer, a homopolypropylene resin was used as the material for the core layer, and an ethylene-1-butene-propylene random copolymer resin was used as the material for the second skin layer, such that each of the layers had a softening temperature as shown in Table 1.

Example 1-3

A barrier film was obtained in the same manner as in Example 1-1 except that an ethylene-propylene random copolymer resin was used as the material for the first skin layer, a homopolypropylene resin was used as the material for the core layer, and an ethylene-propylene random copolymer resin was used as the material for the second skin layer, such that each of the layers had a softening temperature as shown in Table 1.

Example 1-4

A barrier film was obtained in the same manner as in Example 1-1 except that an ethylene-1-butene-propylene random copolymer resin was used as the material for the first skin layer, a homopolypropylene resin was used as the material for the core layer, and an ethylene-propylene random copolymer resin was used as the material for the second skin layer, such that each of the layers had a softening temperature as shown in Table 1.

Comparative Example 1-1

A barrier film was obtained in the same manner as in Example 1-1 except that a homopolypropylene resin was used as the material for the first skin layer, the core layer, and the second skin layer such that each of the layers had a softening temperature as shown in Table 1.

Comparative Example 1-2

A barrier film was obtained in the same manner as in Example 1-1 except that an ethylene-1-butene-propylene random copolymer resin was used as the material for the first skin layer, and a homopolypropylene resin was used as the material for the core layer and the second skin layer, such that each of the layers had a softening temperature as shown in Table 1.

Comparative Example 1-3

A barrier film was obtained in the same manner as in Example 1-1 except that an ethylene-propylene random copolymer resin was used as the material for the first skin layer and the second skin layer, and a homopolypropylene resin was used as the material for the core layer, such that each of the layers had a softening temperature as shown in Table 1.

Comparative Example 1-4

A barrier film was obtained in the same manner as in Example 1-1 except that an ethylene-1-butene-propylene random copolymer resin was used as the material for the first skin layer, a homopolypropylene resin was used as the material for the core layer, and an ethylene-propylene random copolymer resin was used as the material for the second skin layer, such that each of the layers had a softening temperature as shown in Table 1.

Comparative Example 1-5

A barrier film was obtained in the same manner as in Example 1-1 except that an ethylene-propylene random copolymer resin was used as the material for the first skin layer, a homopolypropylene resin was used as the material for the core layer, and an ethylene-propylene random copolymer resin was used as the material for the second skin layer, such that each of the layers had a softening temperature as shown in Table 1.

[Production of Laminate]

A stretched polypropylene film having a thickness of 20 μm, and the surface on the gas barrier layer side of the barrier films produced in Examples 1-1 to 1-4 and Comparative Examples 1-1 to 1-5 were bonded together via a two-component curable urethane adhesive by a dry lamination method. Thereafter, a laminate having a three-layer configuration was produced by bonding the surface of the barrier film on the second skin layer side and an unstretched polypropylene film having a thickness of 60 μm together via the two-component curable urethane adhesive by the dry lamination method.

[Evaluation]

(Softening Temperature Measurement)

The softening temperature of each of the layers constituting the base material layer was measured by the method described below.

Laminates produced from the barrier films produced in Examples 1-1 to 1-4 and Comparative Examples 1-1 to 1-5 were used as measurement samples. The front and back surfaces of this sample were each subjected to a corona treatment at 0.20 kW. For the corona treatment, a corona treatment machine manufactured by KASUGA DENKI, INC. (trade name: CT-0212) was used.

After the corona treatment on the front and back surfaces of the sample, the sample was cut using a razor into a wedge shape (a shape in which triangular surfaces having the base and the height mentioned above are the front and back surfaces of the sample, and the bottom surface and the side surface are the cross section of the sample) which has 1.0 mm base×5.0 mm height. The cut sample was embedded in a photocurable resin and cured using a halogen lamp (manufactured by Kenko Tokina Corporation, trade name: KTX-100R). D-800 (trade name) manufactured by Toagosei Co., Ltd. was used as the photocurable resin. The sample embedded resin after photocuring was fixed with an AFM sample holder insert, and cutting of the cross section of the sample was performed with a glass knife at room temperature (25° C.). Thereafter, final cross section cutting was performed with a diamond knife at a low temperature (−140° C.) by setting a cutting speed to 1.0 mm/s and a cutting film thickness to 100 nm. When a mirror surface was obtained, cutting was completed. As a cross section cutting device, an Ultramicrotome (manufactured by Leica Microsystems GmbH, trade name: EM UC7), and a Cryosystem (manufactured by Leica Microsystems GmbH, trade name: EM FC7) were used. Furthermore, the cutting direction of the knife was parallel to the layer interface. Cutting was performed from the apex of the wedge shape. The cross-sectioned sample was used for the softening temperature measurement in the state of being fixed with the AFM sample holder insert.

The softening temperature measurement and the shape measurement were performed using MFP-3D-SA (trade name) manufactured by Oxford Instruments plc as an atomic force microscope (AFM), using Ztherm system as a local thermal analysis option, and using AN2-200 (trade name) manufactured by Anasys Instruments Corporation with specifications of a spring constant of 0.5 to 3.5 N/m as a cantilever. The softening temperature measurement was performed at the center portion in the thickness direction of each of the layers (first skin layer, core layer, and second skin layer) constituting the base material layer.

When the sample surface was heated after detrend correction by setting the contact pressure of the cantilever (amount of change in amount of deflection of cantilever) to 0.2 V, setting a voltage application rate (temperature rising rate) to 0.5 V/second, and setting a maximum applied voltage to 6.0 V, the sample surface expanded, and the cantilever position rose. When the sample surface was further heated, the sample surface softened, and when the cantilever position fell by 30 nm, the measurement was completed. When Z displacement reached the maximum applied voltage without falling by 30 nm from a change point, a maximum applied voltage at the time of detrend correction and measurement was increased by 0.5 V to perform the measurement again.

A voltage value was read by defining, an applied voltage at a softening point, an applied voltage at a point at which the height (Z displacement) in the vertical direction of the cantilever was maximum.

A calibration curve was created to calculate the softening temperature of the sample. As samples for calibration, the following four types were used: polycaprolactone (melting point: 60° C.), low-density polyethylene (LDPE, melting point: 112° C.), polypropylene (PP, melting point: 166° C.), and polyethylene terephthalate (PET, melting point: 255° C.). A maximum applied voltage at the time of detrend correction was 3.5 V for polycaprolactone, 5.5 V for low-density polyethylene, 6.7 V for polypropylene, and 7.9 V for polyethylene terephthalate. The contact pressure (amount of change in amount of deflection of cantilever) of the cantilever was set to 0.2 V, and the voltage application rate (temperature rising rate) was set to 0.5 V/second. Measurement was performed 20 times while changing measurement positions of the samples for calibration. A calibration curve was created by creating a standard curve by approximating an average value of the applied voltage at the softening point and the melting point with a cubic function using the least squares method.

Using the calibration curve of the applied voltage and the melting point (melt peak temperature), the applied voltage at the softening point of each of the layers (first skin layer, core layer, and second skin layer) constituting the base material layer was converted into a temperature, which was defined as the softening temperature. The results are shown in Table 1.

(Retort Treatment)

Using the laminates produced in Examples 1-1 to 1-4 and Comparative Examples 1-1 to 1-5, packaging bags having four sides as seal portions were produced and filled with water as a content. Thereafter, a retort sterilization treatment was performed at 130° C. for 30 minutes.

(Oxygen Permeability Measurement)

Oxygen permeability measurement was performed on the laminate after the retort treatment. The measurement was performed using an oxygen permeability measurement device (manufactured by Modern Controls, Inc., OXTRAN 2/20) under the conditions of a temperature of 30° C. and a relative humidity of 70%. A measurement method was in accordance with JIS K-7126, B method (isobaric method), and ASTM D3985-81. The measured value was expressed in the unit [$cm^3$ (STP)/$m^2$·day·atm]. The results are shown in Table 1.

(Lamination Strength Measurement)

For the laminate after the retort treatment, lamination strength between the stretched polypropylene film and the barrier film (written as "OPP/barrier" in the table), and lamination strength between the barrier film and the unstretched polypropylene film (written as "Barrier/CPP" in the table) were measured. The measurement was performed in accordance with JIS K6854, with a test width of 15 mm and a peeling rate of 300 mm/minute and at a T-type peeling angle. The measured value was expressed in the unit [N/15 mm]. The results are shown in Table 1.

TABLE 1

| | Softening temperature [° C.] | | | Oxygen permeability | Lamination strength [N/15 mm] | |
|---|---|---|---|---|---|---|
| | First skin layer | Core layer | Second skin layer | [$cm^3/m^2 \cdot day \cdot atm$] | OPP/barrier | Barrier/CPP |
| Example 1-1 | 150 | 205 | 130 | 1.3 | 5.8*1 | 3.5*3 |
| Example 1-2 | 146 | 205 | 135 | 0.7 | 5.7*1 | 3.2*3 |
| Example 1-3 | 164 | 200 | 141 | 1.5 | 3.7*1 | 3.3*3 |
| Example 1-4 | 133 | 198 | 130 | 1.2 | 4.5*1 | 3.5*3 |
| Comparative Example 1-1 | 215 | 215 | 215 | 5.5 | 0.1*2 | 0.3*4 |
| Comparative Example 1-2 | 146 | 205 | 205 | 0.8 | 5.7*1 | 0.5*4 |
| Comparative Example 1-3 | 204 | 205 | 204 | 2.1 | 0.8*2 | 3.3*3 |
| Comparative Example 1-4 | 146 | 205 | 204 | 0.7 | 1.1*5 | 0.8*3 |
| Comparative Example 1-5 | 119 | 205 | 130 | 2.5 | 5.0*1 | 3.3*3 |

*1 Fracturing of a film without peeling at the interface.
*2 Peeling at the interface between the first skin layer and core layer.
*3 Peeling at the interface between the core layer and the second skin layer.
*4 Peeling at the surface layer of the second skin layer.
*5 Transfer of a peeling location to the interface between the core layer and the second skin layer.

As is clear from the results shown in Table 1, it was confirmed that, in the packaging bags formed using the barrier films of Examples 1-1 to 1-4, even after the heat sterilization treatment, oxygen permeability could be suppressed to a low level, and the lamination strength between the layers was excellent. In Comparative Examples 1-1 and 1-3, the reason why the oxygen permeability after the heat sterilization treatment increased was because cracking occurred in the vapor deposition layer at the time of the heat sterilization treatment. Furthermore, in Comparative Example 1-4, the reason why the lamination strength between OPP/barrier was low was because the peeling location transferred to the interface between the core layer and the second skin layer.

Example 2-1

An ethylene-1-butene-propylene random copolymer resin (ethylene content: 2.5 mol %, 1-butene content: 3.5 mol %) was used as the material for the skin layer, and a homopolypropylene resin was used as the material for the core layer. After co-extruding these resins, biaxial stretching was performed to produce a base material film (base material layer) having a total thickness of 20 μm and having the skin layer with a thickness of 0.7 μm and the core layer with a thickness of 19.3 μm. The thickness of the skin layer and core layer was measured by a thickness method to be described later. Table 2 shows the softening temperature of each of the layers.

Subsequently, by gravure coating, an acrylic primer solution was applied onto the skin layer of the base material layer and dried to form an anchor coat layer having a thickness of 0.1 μm. Subsequently, a vapor deposition layer composed of an inorganic oxide was formed by vapor-depositing a thin film of silicon oxide having a thickness of 30 nm on the anchor coat layer by reactive vapor deposition using radio frequency excited ion plating in an oxygen atmosphere under reduced pressure.

Subsequently, tetraethoxysilane (hereinafter referred to as "TEOS"), methanol, and 0.1 N hydrochloric acid were mixed in a mass ratio of 45/15/40 to obtain a TEOS hydrolyzed solution. Three solutions were mixed to prepare a coating solution. The three solutions were: the TEOS hydrolyzed solution, an aqueous solution of 5% by mass of polyvinyl alcohol (hereinafter referred to as "PVA"), and a solution in which 1,3,5-tris(3-methoxysilylpropyl) isocyanurate was diluted with a water/IPA (isopropyl alcohol)=1/1 solution to a solid content of 5% by mass (in terms of $R^2Si(OH)_3$). The coating solution was prepared such that the mass ratio of the $SiO_2$ solid content (converted value) of TEOS, the $R^2Si(OH)_3$ solid content (converted value) of isocyanurate silane, and the PVA solid content was 43/10/47. This coating solution was applied onto the vapor deposition layer by gravure coating, and thereafter dried under conditions of 80° C. and 60 seconds to form a gas barrier layer having a thickness of 0.3 μm. In this manner, a barrier film of Example 2-1 having a laminated structure of gas barrier layer/vapor deposition layer/anchor coat layer/skin layer/core layer was obtained.

Example 2-2

A barrier film was obtained in the same manner as in Example 2-1 except that an ethylene-1-butene-propylene random copolymer resin (ethylene content: 2.0 mol %, 1-butene content: 2.0 mol %) was used as the material for the skin layer such that each of the layers had a softening temperature as shown in Table 2, and that a base material film having the skin layer with a thickness of 0.8 μm and the core layer with a thickness of 19.2 μm was produced.

Example 2-3

A barrier film was obtained in the same manner as in Example 2-1 except that an ethylene-propylene random copolymer resin (ethylene content: 5.0 mol %) was used as the material for the skin layer such that each of the layers had a softening temperature as shown in Table 2, and that a base material film having the skin layer with a thickness of 0.8 μm and the core layer with a thickness of 19.2 μm was produced.

Example 2-4

A barrier film was obtained in the same manner as in Example 2-1 except that an ethylene-propylene random copolymer resin (ethylene content: 3.2 mol %) was used as the material for the skin layer such that each of the layers had a softening temperature as shown in Table 2, and that a base material film having the skin layer with a thickness of 1.5 μm and the core layer with a thickness of 18.5 μm was produced.

Example 2-5

A barrier film was obtained in the same manner as in Example 2-1 except that an ethylene-propylene random copolymer resin (ethylene content: 3.2 mol %) was used as the material for the skin layer such that each of the layers had a softening temperature as shown in Table 2, and that a base material film having a total thickness of 18 μm and having the skin layer with a thickness of 0.3 μm and the core layer with a thickness of 17.7 μm was produced.

Comparative Example 2-1

A barrier film was obtained in the same manner as in Example 2-1 except that a base material film (base material layer) having a total thickness of 20 μm was produced only from the material of the core layer.

Comparative Example 2-2

A barrier film was obtained in the same manner as in Example 2-1 except that an ethylene-1-butene-propylene random copolymer resin (ethylene content: 3.2 mol %, 1-butene content: 5.0 mol %) was used as the material for the skin layer such that each of the layers had a softening temperature as shown in Table 2.

Comparative Example 2-3

A barrier film was obtained in the same manner as in Example 2-1 except that an ethylene-propylene random copolymer resin (ethylene content: 0.7 mol %) was used as the material for the skin layer such that each of the layers had a softening temperature as shown in Table 2, and that a base material film having the skin layer with a thickness of 0.8 μm and the core layer with a thickness of 19.2 μm was produced.

[Production of Laminate]

An unstretched polypropylene film having a thickness of 60 μm was bonded to the surface on the gas barrier layer side of the barrier films produced in Examples 2-1 to 2-5 and Comparative Examples 2-1 to 2-3 via a two-component curable urethane adhesive by a dry lamination method to produce a laminate having a two-layer configuration.

[Evaluation]

(Measurement of Thickness of Skin Layer and Core Layer)

After embedding the produced barrier film using a photocurable resin to produce a block piece, the cross section of the block piece was cut using a diamond knife of an Ultramicrotome (manufactured by Leica Microsystems GmbH, EM UC7). The cross-sectioned portion of the block piece was observed using a scanning electron microscope (manufactured by Hitachi High-Tech Corporation, SU8020) at an observation magnification of 5,000 to 20,000 times, and the thickness was measured from the observed image.

(Softening Temperature Measurement)

The softening temperature of each of the layers (skin layer and core layer) constituting the base material layer in Examples 2-1 to 2-5 and Comparative Examples 2-1 to 2-3 was measured in the same method as the measurement method of the softening temperature of each of the layers constituting the base material layer in Examples 1-1 to 1-4 and Comparative Examples 1-1 to 1-5. The results are shown in Table 2.

(Retort Treatment)

Using the laminates produced in Examples 2-1 to 2-5 and Comparative Examples 2-1 to 2-3, packaging bags having four sides as seal portions were produced and filled with water as a content. Thereafter, a retort sterilization treatment was performed at 130° C. for 30 minutes.

(Oxygen Permeability Measurement)

Oxygen permeability measurement was performed on the laminate after the retort treatment. The measurement was performed using an oxygen permeability measurement device (manufactured by Modern Controls, Inc., OXTRAN 2/20) under the conditions of a temperature of 30° C. and a relative humidity of 70%. A measurement method was in accordance with JIS K-7126, B method (isobaric method), and ASTM D3985-81. The measured value was expressed in the unit [$cm^3$ (STP)/$m^2$·day·atm]. When the oxygen permeation rate was 2.0 $cm^3$ (STP)/$m^2$·day·atm or less, it was determined that the laminate had a low oxygen permeation rate even after the retort treatment. The results are shown in Table 2.

(Lamination Strength Measurement)

For the laminate after the retort treatment, the lamination strength between the barrier film and the unstretched polypropylene film was measured. The measurement was performed in accordance with JIS K6854, with a test width of 15 mm and a peeling rate of 300 mm/minute and at a T-type peeling angle. The measured value was expressed in the unit [N/15 mm]. The results are shown in Table 2.

TABLE 2

| | Softening temperature [° C.] | | Ratio of thickness | Oxygen permeability | Lamination |
|---|---|---|---|---|---|
| | Skin layer | Core layer | (skin layer/ core layer) | [$cm^3/m^2$ · day · atm] | strength [N/15 mm] |
| Example 2-1 | 130 | 210 | 1/28 | 0.9 | 3.5*1 |
| Example 2-2 | 146 | 210 | 1/24 | 0.7 | 3.7*1 |
| Example 2-3 | 146 | 210 | 1/24 | 1.3 | 3.7*1 |
| Example 2-4 | 160 | 210 | 1/12 | 1.2 | 3.2*1 |
| Example 2-5 | 160 | 210 | 1/59 | 1.6 | 3.7*1 |
| Comparative Example 2-1 | — | 210 | — | 5.0 | 0.2*3 |
| Comparative Example 2-2 | 111 | 210 | 1/28 | 3.5 | 1.5*2 |
| Comparative Example 2-3 | 205 | 210 | 1/24 | 1.1 | 0.8*2 |

*1 Fracturing of a film without peeling at the interface between the barrier film and the unstretched polypropylene film.
*2 Peeling between the skin layer and core layer.
*3 Peeling at the surface layer of the base material film (base material layer).

INDUSTRIAL APPLICABILITY

The packaging bag formed using the barrier film according to the present disclosure can be used as a packaging material in which a deterioration in barrier properties and a degradation in adhesion occur less even after a heat sterilization treatment such as a boiling treatment and a retort treatment is performed. Furthermore, as a mono-material packaging material, it is possible to provide a packaging having gas barrier properties and suitable for recycling.

REFERENCE SIGNS LIST

1*a*, 1*b*: Base material layer, 2: Vapor deposition layer, 3: Gas barrier layer, 10*a*, 10*b*: Barrier film, 11*a*: First skin layer, 11*b*: Skin layer, 12: Core layer, 13: Second skin layer, 20*a*, 20*b*, 30*a*, 30*b*: Laminate, 22: Second base material layer, 23: Sealant layer, 24: Adhesive layer.

The invention claimed is:

1. A barrier film comprising, in the following order:

a base material layer containing polypropylene;

a vapor deposition layer containing an inorganic oxide; and a gas barrier layer, wherein the base material layer has a multilayer structure in which at least three layers, which are a first skin layer, a core layer, and a second skin layer, are provided in this order, and when a softening temperature of each of the layers of the base material layer is measured by local thermal analysis (LTA), at least one softening temperature of the first skin layer is 120° C. or higher, at least one softening temperature of the core layer is 190° C. or higher, and at least one softening temperature of the second skin layer is 160° C. or lower.

2. The barrier film according to claim 1, wherein, when the softening temperature of the first skin layer is measured by LTA, at least one softening temperature of the first skin layer is 120° C. or higher and 170° C. or lower.

3. The barrier film according to claim 1, wherein, when the softening temperature of the second skin layer is measured by LTA, at least one softening temperature of the second skin layer is 120° C. or higher and 160° C. or lower.

4. The barrier film according to claim 1, wherein the first skin layer and the second skin layer contain a copolymer of propylene and α-olefin.

5. The barrier film according to claim 1, wherein, when the softening temperature of each of the layers of the base material layer is measured by LTA, at least one softening temperature of the core layer is higher than any of the softening temperatures of the first skin layer and the second skin layer.

6. The barrier film according to claim 1, wherein, when the softening temperature of each of the layers of the base material layer is measured by LTA, at least one softening temperature of the first skin layer is higher than any of the softening temperatures of the second skin layer.

7. The barrier film according to claim 1, wherein a thickness of each of the first skin layer and the second skin layer is 2.0 μm or less.

8. The barrier film according to claim 1, wherein the vapor deposition layer is formed on a surface of the first skin layer which is on an opposite side to the core layer, and further comprising an anchor coat layer between the first skin layer and the vapor deposition layer.

9. A barrier film comprising, in the following order:

a base material layer containing polypropylene;

a vapor deposition layer containing an inorganic oxide; and a gas barrier layer, wherein the base material layer has two layers, which are a skin layer and a core layer, in order from the vapor deposition layer, and when a softening temperature of each of the layers of the base material layer is measured by local thermal analysis (LTA), at least one softening temperature of the skin layer is 115° C. or higher and 170° C. or lower, and at least one softening temperature of the core layer is 190° C. or higher.

10. The barrier film according to claim 9, wherein the skin layer contains a copolymer of propylene and α-olefin.

11. The barrier film according to claim 9, wherein the skin layer contains an ethylene-1-butene-propylene random copolymer.

12. The barrier film according to claim 9, wherein a thickness of the skin layer is 0.2 μm or more and 2.0 μm or less.

13. The barrier film according to claim 9, wherein a ratio of a thickness of the skin layer to a thickness of the core layer is 1/100 to 1/5.

14. The barrier film according to claim 9, further comprising an anchor coat layer between the skin layer and the vapor deposition layer.

15. A laminate comprising:

the barrier film according to claim 1; and a sealant layer, wherein the sealant layer contains polyolefin.

16. The laminate according to claim 15, further comprising:

a second base material layer on a surface on an opposite side to the sealant layer of the barrier film, wherein the second base material layer contains polyolefin.

17. A packaging bag formed by making the laminate according to claim 15 into a pouch shape.

18. A laminate comprising:

the barrier film according to claim 9; and a sealant layer, wherein the sealant layer contains polyolefin.

19. The laminate according to claim 18, further comprising:

a second base material layer on a surface on an opposite side to the sealant layer of the barrier film, wherein the second base material layer contains polyolefin.

20. A packaging bag formed by making the laminate according to claim 18 into a pouch shape.

* * * * *